United States Patent
Bischoff et al.

(10) Patent No.: US 10,109,014 B1
(45) Date of Patent: Oct. 23, 2018

(54) PRE-CALCULATED INSURANCE PREMIUMS WITH WILDCARDING

(71) Applicant: Allstate Insurance Company, Northbrook, IL (US)

(72) Inventors: Richard D. Bischoff, LaGrange, IL (US); Nicholas J. Reed, Round Lake, IL (US); Timothy S. Lenahan, Bloomingdale, IL (US); Eric Huls, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 513 days.

(21) Appl. No.: 14/813,741

(22) Filed: Jul. 30, 2015

Related U.S. Application Data

(63) Continuation-in-part of application No. 14/075,665, filed on Nov. 8, 2013, now abandoned, and a continuation-in-part of application No. 13/840,251, filed on Mar. 15, 2013, now abandoned.

(51) Int. Cl.
*G06Q 40/08* (2012.01)
*G06F 17/30* (2006.01)
*G07C 5/00* (2006.01)
*H04L 29/08* (2006.01)
*H04L 12/815* (2013.01)

(52) U.S. Cl.
CPC ....... *G06Q 40/08* (2013.01); *G06F 17/30424* (2013.01); *G06F 17/30979* (2013.01); *G07C 5/008* (2013.01); *H04L 47/22* (2013.01); *H04L 67/1004* (2013.01)

(58) Field of Classification Search
None
See application file for complete search history.

(56) References Cited

U.S. PATENT DOCUMENTS

| | | | |
|---|---|---|---|
| 5,673,402 A | 9/1997 | Ryan et al. | |
| 7,146,346 B2 | 12/2006 | Perotti et al. | |
| 7,219,061 B1 | 5/2007 | Erdem et al. | |
| 7,912,890 B2 * | 3/2011 | Cornea-Hasegan | G06F 7/4915 708/495 |
| 8,086,523 B1 * | 12/2011 | Palmer | G06Q 40/025 705/38 |

(Continued)

OTHER PUBLICATIONS

Sep. 29, 2016—U.S. Final Office Action—U.S. Appl. No. 13/840,251.

(Continued)

*Primary Examiner* — Joseph W. King
(74) *Attorney, Agent, or Firm* — Banner & Witcoff, Ltd.

(57) ABSTRACT

Systems and methods involving a rating module that accesses a single, voluminous table or multiple tables stored in a searchable data store (e.g., database) to execute various queries (e.g., SQL JOIN) to search the table(s) is disclosed. The system may include—an underlying linear programming platform (e.g., optimization engine and associated components) that includes an application programmer's interface (e.g., Python API) that may be used to perform optimization using illustrative optimization libraries (e.g., optimizer). The system may be communicatively coupled with a vehicle and/or other device to communicate/output ratings information to a user.

18 Claims, 16 Drawing Sheets

(56) References Cited

U.S. PATENT DOCUMENTS

| | | | |
|---|---|---|---|
| 8,140,358 B1* | 3/2012 | Ling | G06Q 40/08 340/439 |
| 2003/0023568 A1 | 1/2003 | Perotti et al. | |
| 2009/0006156 A1 | 1/2009 | Hunt et al. | |
| 2012/0066005 A1 | 3/2012 | Stewart et al. | |
| 2012/0166228 A1 | 6/2012 | Singleton et al. | |
| 2012/0221358 A1* | 8/2012 | Pallesen | G06Q 20/201 705/4 |
| 2013/0018901 A1* | 1/2013 | Bnayahu | G06F 17/30979 707/756 |
| 2014/0278581 A1* | 9/2014 | Fasking | G06Q 40/08 705/4 |
| 2015/0206248 A1 | 7/2015 | Kornweibel et al. | |

OTHER PUBLICATIONS

Nov. 4, 2016—U.S. Final Office Action—U.S. Appl. No. 14/075,650.
Nov. 22, 2016—U.S. Non-Final Office Action—U.S. Appl. No. 14/075,665.
Feb. 1, 2016—U.S. NonFinal Office Action—U.S. Appl. No. 14/075,665.
Jun. 23, 2016—U.S. Final Office Action—U.S. Appl. No. 14/075,665.
Distributed Search with Index Sharding, Apache Solr Refernce Guide—Apache Software Foundation, https://cwiki.apache.org/confluence/display/solr/Distributed+Seach+with+Index+Sharing, retrieved Oct. 23, 2013, 6 pages.
What is Distributed Search, Solrl.3, wiki.apache.org/solr/DistributedSearch, retrieved Oct. 23, 2013, 4 pages.
"Gurobi—Optimizing LP Problems: a primer on the basics of linear programming," © 2013 Gurobi Optimization, pp. 1-54, available at www.gurobi.com/resources/getting-started/lp-basics.
Jun. 26, 2014—U.S. File History from U.S. Appl. No. 13/840,251.
Aug. 4, 2015—U.S. Final Office Action—U.S. Appl. No. 14/075,665.
Aug. 27, 2015—U.S. NonFinal Office Action—U.S. Appl. No. 14/075,650.
Aug. 25, 20154—U.S. NonFinal Office Action—U.S. Appl. No. 13/840,251.
Jun. 29, 2015—U.S. NonFinal Office Action—U.S. Appl. No. 13/840,326.

* cited by examiner

| Cell | Populated? | Exposure | Indicated Factor | Tier | Actual Factor | Discount |
|---|---|---|---|---|---|---|
| 1 | Y | 1 | 1.00 | 1 | 1.00 | 0% |
| 2 | Y | 1 | 1.10 | 2 | 1.10 | 0% |
| 3 | N |  | 1.20 | 2 | 1.10 | -8% |
| 4 | Y | 1 | 1.30 | 4 | 1.30 | 0% |
| 5 | N |  | 1.40 | 4 | 1.30 | -7% |
| 6 | N |  | 1.10 | 1 | 1.00 | -9% |
| 7 | N |  | 1.21 | 2 | 1.10 | -9% |
| 8 | N |  | 1.32 | 2 | 1.10 | -17% |
| 9 | Y | 1 | 1.43 | 5 | 1.40 | -2% |
| 10 | N |  | 1.54 | 5 | 1.40 | -9% |
| 11 | N |  | 1.20 | 2 | 1.10 | -8% |
| 12 | Y | 1 | 1.32 | 4 | 1.30 | -2% |
| 13 | Y | 1 | 1.44 | 5 | 1.40 | -3% |
| 14 | N |  | 1.56 | 5 | 1.40 | -10% |
| 15 | Y | 1 | 1.68 | 8 | 1.70 | 1% |
| 16 | Y | 1 | 1.30 | 4 | 1.30 | 0% |
| 17 | Y | 1 | 1.43 | 5 | 1.40 | -2% |
| 18 | N |  | 1.56 | 5 | 1.40 | -10% |
| 19 | N |  | 1.69 | 5 | 1.40 | -17% |
| 20 | Y | 1 | 1.82 | 9 | 1.80 | -1% |
| 21 | N |  | 1.40 | 4 | 1.30 | -7% |
| 22 | Y | 1 | 1.54 | 6 | 1.50 | -3% |
| 23 | N |  | 1.68 | 5 | 1.40 | -17% |
| 24 | Y | 1 | 1.82 | 9 | 1.80 | -1% |
| 25 | N |  | 1.96 | 9 | 1.80 | -8% |

FIG. 2

| MODEL TO PREDICT RENEWAL RETENTION | | | | | |
|---|---|---|---|---|---|
| Parameter | Description of Variable | Param. Estimate | Standard | Wald | Pr > ChiSq |
| *Intercept* | - | 4.xxxx | 0.1202 | 1619.959 | <.0001 |
| Policy Group | Policy Group from rating plan | -0.0xxx | 0.00928 | 63.3557 | <.0001 |
| nom_IS_hit | Insurance score no hit flag | -0.5xxx | 0.1471 | 15.6025 | <.0001 |
| *nom_pref_pkg_dsc* | Preffered Packaged Discount is present | 0.53xx | 0.1514 | 12.3593 | 0.0004 |
| ••• | ••• | ••• | ••• | ••• | |
| *nom_prior_all state* | Prior insurance carrier is an Allstate affiliated company | 0.3xxx | 0.0511 | 55.7431 | <.0001 |
| *nom_opt_pkg_cd* | YCA Package Platinum | 0.38xx | 0.0662 | 33.0026 | <.0001 |
| nom_weakly_fully_ins | Collision or comprehensive coverage not present on policy | -0.2xxx | 0.0726 | 14.3032 | 0.0002 |

FIG. 4

| MODEL TO PREDICT MIDTERM DEFECTION FOR POLICIES WITH NTR >= 1 | | | | | |
|---|---|---|---|---|---|
| Parameter | Description of Variable | Param. Estimate | Error | Chi-Square | |
| *Intercept* | - | 4.xxx | 0.1317 | 1163.4756 | <.0001 |
| int_IS_group | Policy Group from rating plan | -0.08xx | 0.00891 | 92.337 | <.0001 |
| nom_IS_hit | Insurance score no hit flag | -0.65xx | 0.1432 | 20.6132 | <.0001 |
| real_before_prem_per | Average premium per item before renewal offering | -0.001xx | 0.000141 | 66.1879 | <.0001 |
| ••• | ••• | ••• | ••• | ••• | ••• |
| posPriorPctPremChange1 | Previous experienced rate change that are greater than 0 | -0.7xxx | 0.375 | 3.7834 | 0.0518 |
| posPriorPctPremChange2 | Second previous experienced rate change that is greater than 0 | -1.xxx | 0.5563 | 4.6765 | 0.0306 |
| NTR_lt_2_ind | NTR is less than 2 | -0.2xxx | 0.1207 | 3.2646 | 0.0708 |
| NTR_lt_3_ind | NTR is less than 3 | -0.1xx | 0.0611 | 3.6593 | 0.0558 |

FIG. 5

| Zip | # Vehicles | Age Oldest | Speeding | Majors | Deductible | Limit | BI Factor | COLL Factor |
|---|---|---|---|---|---|---|---|---|
| 49267 | * | * | * | * | * | * | 250 | 100 |
| 49268 | * | * | * | * | * | * | 275 | 75 |
| * | 3 | * | * | * | * | * | 0.90 | 0.95 |
| * | 4+ | * | * | * | * | * | 0.85 | 0.90 |
| * | * | 16-29 | * | * | * | * | 2 | 2 |
| * | * | 30-44 | * | * | * | * | 1 | 1 |
| * | * | 45-59 | * | * | * | * | 1 | 0.95 |
| * | * | 60+ | * | * | * | * | 1.25 | 1.25 |
| * | * | * | 0 | 0 | * | * | 1 | 1 |
| * | * | * | 0 | 1+ | * | * | 2 | 2 |
| * | * | * | * | * | 500 | * | 1 | 0.95 |
| * | * | * | * | * | * | 15k | 1.00 | 1 |
| * | * | * | * | * | * | 100k | 1.20 | 1 |

FIG. 14

PRE-CALCULATED INSURANCE PREMIUMS WITH WILDCARDING

This application is both a continuation-in-part of U.S. patent application Ser. No. 14/075,665, filed Nov. 8, 2013, and a continuation-in-part of U.S. patent application Ser. No. 13/840,251, filed Mar. 15, 2013; all of the aforementioned are herein incorporated by reference in their entireties.

BACKGROUND

Linear programming (LP) algorithms using a simplex method have been known since the 1940s to solve linear programming problems. Some say George Dantzig likely proposed the first linear programming algorithm. To date, linear programming remains an efficient and reliable method for solving such problems. The speed and efficiency with which linear programs run is dependent on the underlying platform used. For example, the GUROBI™ simplex solver can be on average multiple times faster than some open-source simplex solvers. The difference comes down to some main factors: sparse linear algebra, handling of numerical errors, and effective heuristic strategies.

Regarding sparse linear algebra, the constraint matrices that arise in linear programming can sometimes be extremely sparse; sparse matrices/vectors contain few non-zero entries. Sparse matrices may need to be factored, systems of sparse linear equations may need to be solved using the resulting factor matrices, the factor matrices may need to be modified, etc. Regarding the careful handling of numerical errors, whenever systems of linear equations are solved in finite-precision arithmetic, slight numerical errors in the results are inevitable. Efficient LP algorithms include strategies for managing such errors. Finally, regarding heuristic strategies for making selections during the course of the solution process, the difference can mean a more efficient optimization scheme.

Furthermore, algorithms are known in the art for calculating a premium amount for an insurance policy. For example, some insurance companies use factors such as a territory factor (e.g., a zip code/location of an asset), age factor (e.g., number of months in the life of a person or asset), vehicle factor, insurance score factor, claim history factor, and other factors known to a person having ordinary skill in the art, in order to calculate a premium amount for a particular insurance policy. However, such prior art algorithms leave substantial room for improvement.

In addition, in traditional insurance systems, each of the aforementioned insurance factors is assessed, the system obtains/assigns values for each factor, and then engages in various calculations to determine an insurance rate/premium to assign to the insurance policy. When numerous factors are being assessed, the requisite calculations can require substantial coordination with one or more systems and processor-intensive, time-consuming calculations.

Furthermore, in the insurance industry, determining how to price an insurance policy is a complex process and is sometimes referred to as an insurance rating system or an insurance rating function. A large amount of information is inputted into an insurance rating system, then it is processed/analyzed, and a premium (e.g., price) for an insurance policy is outputted. Given the large amount of data involved, insurance rating systems are typically memory intensive and/or computation intensive. Particularly, the table scheme poses a big hurdle when implementing changes to the rating plan, or even implementing a new rating plan; every single step may need to be programmed and tested individually. It can be time consuming and expensive to update an established rating system. This has led to long lead times and high costs in going to market, thus existing insurance rating systems are inefficient and often slow to update.

Thus, there is much room for improvement in the way insurance rating systems are designed and operate/function, including systems and methods for more efficiently updating the technological systems that calculate insurance rates/premiums.

BRIEF OVERVIEW

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses involving pre-calculated insurance premiums with wildcarding. In some embodiments, the system may perform steps comprising at least one or more of: storing a data structure comprising a wildcard value representing factors that automatically match any value; receiving personal insurance factors and vehicle factors; identifying, using a search module, a plurality of pre-calculated insurance premium amounts in the data structure; aggregating, by the search module, the plurality of pre-calculated insurance premium amounts to calculate an aggregated pre-calculated insurance premium amount; calculating an insurance premium amount quote using the aggregated pre-calculated insurance premium amount and a base insurance premium amount; and outputting, over a network to a display screen, the insurance premium amount quote.

Other features and advantages of the disclosure will be apparent from the additional description provided herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 2 is a diagram of a tabular solution to a linear programming (LP) optimization problem according to one or more aspects of the disclosure;

FIG. 4 illustrates a portion of a model for insurance policy renewal retentions in accordance with one or more aspects of the disclosure;

FIG. 5 illustrates a portion of a model for mid-term insurance policy defection in accordance with one or more aspects of the disclosure;

FIG. 14 is an illustrative data structure (e.g., table) comprising wildcard values in accordance with one or more aspects of the disclosure.

Figure 1:
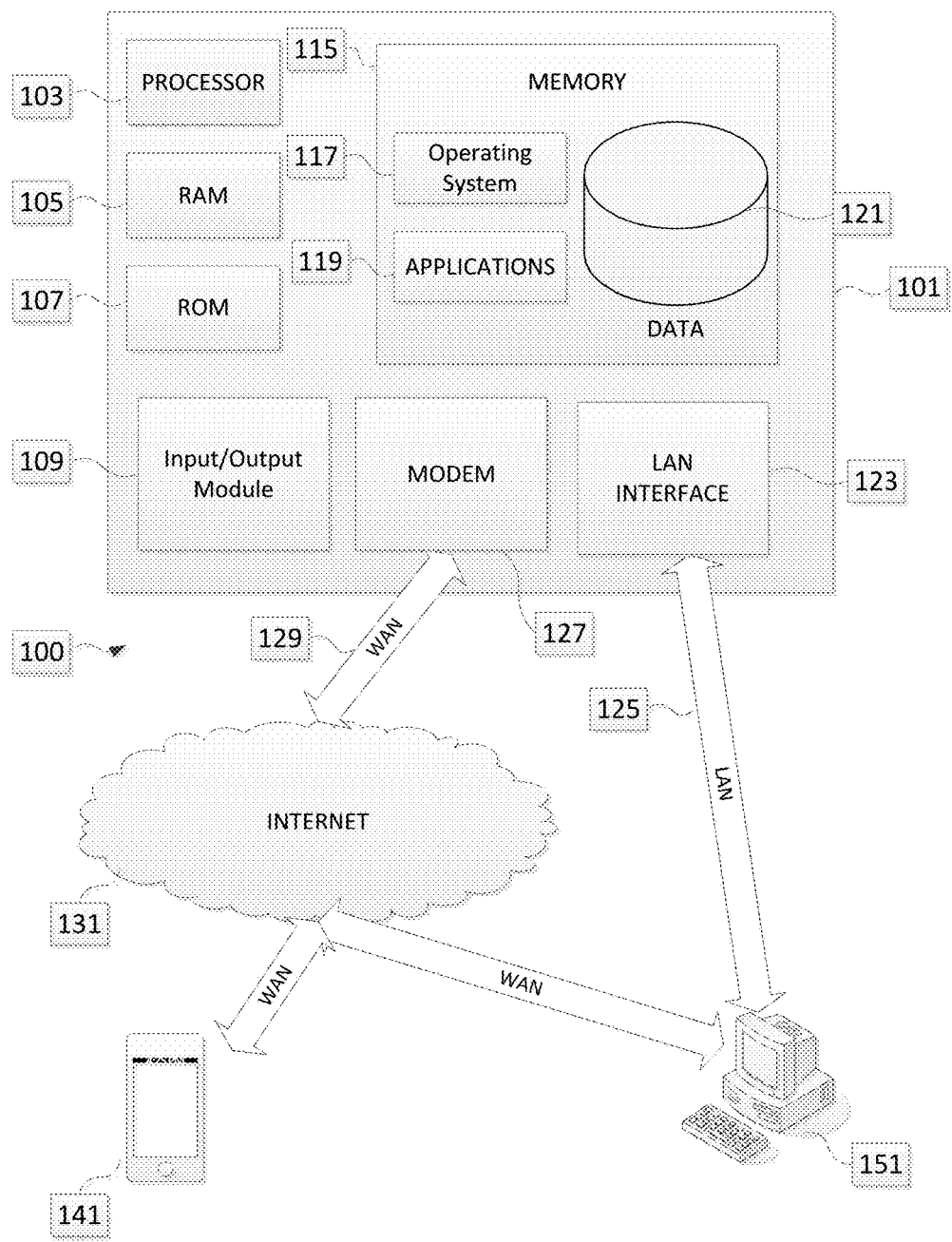
FIG. 1 illustrates a network environment and computing systems that may be used to implement aspects of the disclosure.

In the following description of the various examples, reference is made to the accompanying drawings, which form a part hereof, and in which is shown by way of illustration, various examples of the disclosure that may be practiced. It is to be understood that other examples may be utilized.

DETAILED DESCRIPTION

In accordance with various aspects of the disclosure, methods, apparatuses, and systems are disclosed for more efficiently updating the technological systems that calculate insurance rates/premiums for an insurance policy (e.g., auto insurance policy).

In contrast to prior art systems, in some embodiments of the disclosure, an engine-less rating system is disclosed where possible combinations of insurance factors are pre-calculated and recorded in unstructured and/or semi-structured data formats, such as a table (e.g., a lookup table, hash table, tree, or other comparable data structure). In some embodiments in accordance with various aspects of the disclosure, the system may be configured such that no arithmetic calculations are performed outside of the engine-less rating module in calculating a premium amount for an insurance policy. Alternatively, in a semi-engine-less approach, the system may be configured to reduce the number of arithmetic calculations that are performed outside of the engine-less rating module.

In some embodiments in accordance with various aspects of the disclosure, the number of cells/objects/nodes in the data structure may be in the hundreds of millions, or even billions or trillions. For example, the engine-less rating module may access a data structure (e.g., a single, enormous table) stored in a searchable data store (e.g., database, file system (e.g., HDFS, ACFS, LTFS, VMFSS, ReFS, FAT32, NTFS, HFS, and others), or other data store). In another example, the engine-less rating module may access multiple tables stored in a searchable data store and may execute various SQL queries (e.g., JOIN) to search among the tables.

In yet another embodiment, the data structure storing the pre-calculated values may include additional columns/attributes/cells associating particular insurance factor "tuples" with non-insurance information. For example, the non-insurance values may be used for data mining/analytics, marketing, business development, or other purposes not directly related to the calculation of an insurance premium for an insurance policy. Examples of non-insurance values may include, but are not limited to, descriptive and/or editorial content, such as values like text/images/speech/video/maps/others, which may require further computations to quantify.

Meanwhile, in some, but not all embodiments, this disclosure describes, inter alia, a complementary group rating (CGR) system comprising numerous components and structures that operate and communicate together to achieve at least some of the advantages described herein. In one embodiment in accordance with various aspects of the disclosure, the CGR system may determine an insurance rating factor for a user's insurance policy. Typically in the past, expected losses were considered in determining premium pricing. Individuals were grouped based on similar expected losses. For example, individuals with expected losses of $10, $11 and $12 could all be placed into a group with a value of 11 (i.e., the average of their expected losses). The premium amount charged for the individuals' policies would be $11. Individuals with different expected losses were typically not grouped together. In stark contrast, the methods, apparatuses, and systems disclosed herein do not necessarily require putting user with similar losses into the same grouping/tier. Rather, some of the methods, apparatuses, and systems disclosed herein allow an insured to be considered on factors other than just expected loss.

In one embodiment in accordance with various aspects of the disclosure, a CGR system results in a structural modification to an existing rating plan (e.g., an insurance rating plan) to allow pricing decisions to be made at a more granular (e.g., finer) level. In some embodiments, at least one benefit includes the ability to rate users (e.g., existing customers up for renewal, potential new customers requesting quotes, returning prior customers, and others) more effectively and accurately. For example, after a CGR system has been initialized, modifications to the structures of the system (e.g., tables) may be made relatively quickly/efficiently and/or inexpensively. Furthermore, in some embodiments, in contrast to known multiplicative rating approaches, the CGR system may permit rate changes specific to one or more microsegments while leaving other complementary microsegments unchanged.

In some embodiments of the disclosure, the CGR system may be more efficiently updated using various enhancement features. For example, the CGR system may be configured to recognize a "wildcard" value, which means that any value matches the "wildcarded" cell in the insurance rating table, in the data store. As such, in response to a query, the CGR system may now return multiple rows instead of just single row. The CGR system may be enhanced, in some embodiments, to aggregate via a predefined operation (e.g., Cartesian multiplication, addition, other mathematical operations, etc.) the multiple rows/values into a single rate calculation. Furthermore, instead of storing the entire Cartesian product, the original tables may be embedded into the data store/database of the CGR system without the loss of information.

The CGR system may be communicatively coupled with a vehicle and/or other device to communicate/output ratings information to a user.

Furthermore, in accordance with various aspects of the disclosure, an optimization scheme is disclosed for calculating CGR premium rates. The optimization scheme may use a model to assist in calculating optimal assignments of CGR rates in the context of a flexible scheme of objectives, constraints, and/or other parameters. Notably, the optimization scheme allows for factors, such as price elasticity, in addition to expected loss, to be considered when pricing insurance policies. As such, the CGR tier/factor may be determined based on an insurance rate, which is distinct from typical prior art methods used in the industry.

This disclosure describes, inter alia, the CGR system with its CGR rating structure and explains how, given a CGR tier-CGR_factor table, CGR factors may be assigned to microsegments via CGR tier designations. Through these tables, user insurance policies may be grouped into tiers (e.g., CGR tiers), with each tier representing a separate insurance rating factor. In addition, this disclosure describes, inter alia, various steps of an illustrative optimization scheme for use in assigning CGR tiers to microsegments. Since there may be many millions of microsegments and the tier assignments must be actuarially justified, the optimization scheme ensures that the sum of the expected losses in the tier is equal to the sum of what is being charged for policies in that tier (plus stated profit, etc.) Such intensive processing is not possible with merely paper and pen or in the human mind. Rather, the CGR system is built using a sophisticated underlying linear programming platform that is commercially available and within the knowledge of a person having ordinary skill in the art. The linear programming platform (e.g., optimization engine and associated components) includes an application programmer's interface (e.g., Python API) that may be used to perform optimization using illustrative optimization libraries (e.g., the commercially-available GUROBI™ optimizer).

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a computing device (or system) 101 in communication system 100 that may be used according to one or more illustrative embodiments of the disclosure. The device 101 may have a processing unit comprising a processor 103 (e.g., an INTEL™ microprocessor or other manufacturer's microprocessor) for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices configured as described herein to operate a complementary group rating (CGR) system. Various computing devices and storage devices may be involved in performing optimizations and generating the illustrative microsegment-CGR tier tables and CGR tier-CGR_factor tables disclosed herein.

The disclosure describes, in one example, an illustrative linear program (LP) executing on one or more computing devices 101 (e.g., application server 604 in FIG. 6) that determines assignments of microsegments to CGR tiers. Given the intensive computations that may be involved with executing the LP, in some embodiments, computing device 101 may include a farm of server computers working in parallel (e.g., parallel computing) to execute the optimization scheme of the LP. Moreover, the RAM computer memory 105 available to the computing devices 101 may be increased (e.g., more than about 50 Gigabytes) to accommodate the computations. The LP may be configured, designed, and/or executed using a conventional computing device (e.g., application server(s) of FIG. 6). Although examples, pseudo-code, and other details are provided herein, other examples and implementations will be apparent to a person having ordinary skill in the art after review of the entirety disclosed herein. Additionally, one or more application programs 119 used by the CGR system may include computer executable instructions (e.g., optimization scheme, optimization engine, and others) for performing the method steps disclosed herein, and other related functions.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the CGR system to execute a series of computer-readable instructions to perform the method steps disclosed herein.

The system 101 may operate in a networked environment 100 supporting connections to one or more remote computers, such as terminals 141 and 151. The terminals 141 and 151 may be personal computers (e.g., end-user customer computers, insurance agent computers, and the like), servers (e.g., web servers, database servers, application servers, and the like), mobile communication devices, portable computing devices and the like that include many or all of the elements described above with respect to the CGR system. The network connections depicted in FIG. 1 include a local area network (LAN) 125 and a wide area network (WAN) 129, but may also include other networks. When used in a LAN networking environment, the vehicle financing system 101 may be connected to the LAN 125 through a network interface or adapter 123. When used in a WAN networking environment, the CGR system may include a modem 127 or other means for establishing communications over the WAN 129, such as network 131 (e.g., the Internet). It will be appreciated that the network connections shown are illustrative and other means of establishing a communications link between the computers may be used. The existence of any of various well-known protocols such as TCP/IP, Ethernet, FTP, HTTP and the like is presumed.

This disclosure describes, inter alia, a CGR rating structure, including illustrative microsegment-CGR tier tables, CGR tier-CGR factor tables, an application server 604, and a data store 302. Other components and structures of an illustrative system in accordance with various aspects of the disclosure are also described herein.

A microsegment is a predefined combination of characteristics (e.g., user characteristics) that, taken together, defines a user segment. In one example, the following user characteristics may be combined to define particular microsegments:

Zip code (e.g., 5 digit zip code+4 digit code)
Birthday (e.g., date of birth—MM/DD/YY)
Years with prior carrier (e.g., 0, 1, 2, 3, 4, 5+)
Oldest operator age (e.g., date of birth of oldest operator on the policy)

A person having ordinary skill in the art, after review of the entirety disclosed herein, will appreciate that although the preceding user characteristics have been identified, other user characteristics may be included (or one or more of the preceding user characteristics may be omitted) in defining microsegments, such as, without limitation, age (in months, weeks or other measurement), location (city, zip code, zip code+4, British royal mail codes, European postal codes, other location information), car purchase value and other characteristics. For example, in a system where no four-digit code is appended to a five digit zip code, the system may supplement the preceding predefined combination with one or more additional user characteristics. At least one objective of the predefined combination of user characteristics is to divide a user segment into highly granular microsegments. In some examples, each highly granular microsegment may achieve a one-to-one correspondence with user insurance policies. In other examples, the percentage of microsegments that correspond to no more than one insurance policy is more than 90%, 95%, 98%, 99%, 99.5%, 99.5%, 99.95%, 99.99%, 99.995% and 99.999%. As a result, the number of microsegments may be potentially very large. A highly differentiated universe of highly granular microsegments involves a set of microsegments in which the percentage of microsegments that correspond to no more than one insurance policy is 99.9%.

A person having ordinary skill in the art, after review of the entirety disclosed herein, will appreciate that data corresponding to insurance policies may be stored in computer memory. Such data may include the value of user characteristics corresponding to these insurance policies. These values may be stored in computer memory in one or more tables (e.g., as in a database) or in other formats (e.g., as objects in an object-oriented data store). The system may perform one or more operations (e.g., fork, join, other SQL commands, or other operations) on the values stored in computer memory in order to read the appropriate values and assign the insurance policy to a microsegment.

In one example, a new characteristic (i.e., a microsegment characteristic) may be added to the computer memory storing the data corresponding to insurance policies. This microsegment characteristic may be set to a value (e.g., 1, 2, 3, and so on) corresponding to the microsegment of the insurance policy. In some examples, the value may be an integer value, string, hexadecimal number, unique hash value (i.e., a value generated using the predefined combination of user characteristics as an input), or other format known to a person having ordinary skill in the art, as illustrated:

TABLE 1

| Zip Code + 4 | DOB | YPC | Oldest Op Age | Microsegment |
|---|---|---|---|---|
| 22222-1111 | Jan. 21, 1983 | 0 | 29 | 1 |
| 22222-1111 | Feb. 22, 2984 | 5+ | 37 | 2 |
| 22223-1112 | Jan. 21, 1983 | 2 | 72 | 3 |

Alternatively, a separate microsegment characteristic might not be added to the computer memory (e.g., as in Table 1 above) storing the data corresponding to insurance policies. Rather, the system may use an illustrative microsegment-CGR tier table, as shown:

TABLE 2

| Microsegment | | | | |
|---|---|---|---|---|
| Zip Code + 4 | DOB | YPC | Oldest Op Age | CGR Tier |
| 22222-1111 | Jan. 21, 1983 | 0 | 29 | TGS |
| 22222-1111 | Feb. 22, 2984 | 5+ | 37 | 6E0 |
| 22222-1112 | Jan. 21, 1983 | 2 | 72 | ZAP |

The microsegment-CGR tier table may be integrated into an existing table in computer memory by adding a "CGR tier" column/characteristic to the table. At least one benefit of this approach is reduced database/data store usage because data corresponding to insurance policies and "CGR tier" values are stored in a single table/object, thus avoiding data duplication. In an alternative embodiment, the microsegment-CGR tier table may be a separate table in computer memory consisting of two columns mapping a microsegment value to a CGR tier value. At least one benefit of a separate two-column microsegment-CGR tier table may be computing efficiency/speed gains, especially when the number of microsegments in the table is large.

In most instances, the combination of characteristics used to determine microsegments results in a sufficiently fine segmentation such that there is exactly one policy to a microsegment (i.e., there is a one-to-one mapping). In some instance, however, a microsegment may correspond to multiple insurance policies; in other words, a collision scenario occurs. Take the values in Table 3 for example:

TABLE 3

| | | Microsegment | | |
|---|---|---|---|---|
| User ID | ZipCode | Birthday | YPC | Oldest Op Age |
| 00001 | 22222 | Jan. 21, 1983 | 4 | 29 |
| 00002 | 22222 | Jan. 21, 1983 | 4 | 29 |
| 00003 | 874766 | May 4, 1977 | 2 | 72 |

Using the four-tuple combination of zip code, birthday, YPC, and oldest op. age to define a microsegment, the policies corresponding to User 00001 and User 00002 are classified into the same microsegment in Table 3. As such, these two policies collide (i.e., a collision occurs). Since the two policies fall into the same microsegment bucket, they are assigned the same CGR tier value. This is because, in some examples, there is a mapping between microsegments and user insurance policies. In an alternate example involving a modified (not shown) version of Table 3, the four-tuple combination defining a microsegment may include the zip code+4 characteristic instead of the zip code characteristic, thus resulting in a more granular definition of microsegment. As a result, depending on the values of the zip code+4 characteristics, the policies corresponding to User 0001 and User 0002 may fall into different microsegments.

In the preceding examples involving determination of microsegments, the system may create a table (e.g., microsegment-CGR tier table) to map a CGR tier value to each microsegment using techniques described in more detail below. The table, such as Table 2 in one example, may associate a three-character CGR tier code to each possible microsegment and may be potentially very large. In one example, some states in the U.S. (e.g., Virginia) may have about four-hundred million microsegments based on a predefined combination of user characteristics, such as the four-tuple described above. The number of microsegments in the table may depend upon the universe of possible values that might be stored in each of the user characteristics that together define a microsegment. For example, assuming a four-tuple combination of zip code+4, birthday, year with prior carrier, and oldest operator age, the system may determine all possible values for each of these four user characteristics. For example, there may a predetermined number of zip codes in the state of Virginia. Meanwhile, the earliest possible birthdate of any currently living person may be Jan. 1, 1900, for example. Likewise, the "years with prior carrier" characteristic may have values ranging from 0 to some predetermined number. The number of microsegments in a table for Virginia insurance policies may be very large (e.g., approx. four-hundred million). A person having ordinary skill in the art after review of the entirety disclosed herein will recognize that the number of microsegments in this illustrative table will be equal to the multiplication of the quantity of zip code+4, quantity of possible birthdates, quantity of possible years with prior carrier values, and quantity of possible oldest operator age values.

In addition to the microsegment-CGR tier table, in some embodiments, the system may also use a CGR tier-CGR factor table. The CGR tier-CGR factor table may be much smaller than the microsegment-CGR tier table, and may provide a lookup from the CGR tier (e.g., the three-character tier code or other value) to the CGR factor (e.g., a numeric value that can be incorporated into the premium calculation for the insurance policy):

TABLE 4

| CGR Tier | CGR Factor |
|---|---|
| TGS | 1.10462212 |
| 6E0 | 1 |
| ZAP | .951465688 |

In one example, Table 4 above may include three hundred CGR tiers with tier factors of $1.01^i$ for $i=-100, -99, \ldots 99, 100$, such that the spread in factors is 0.37 to 2.7. In some examples, less than all three hundred CGR tiers may be used (e.g., only 201 tiers) so that some tiers (e.g., 99 remaining tiers) may be reserved for desired future use. Although the example of Table 4 uses the aforementioned number of tiers and tier factor values, other numbers and values may be used based on, for example, the desired amount of spread and/or granularity of factors. Moreover, in some examples the CGR tier-CGR factor table may be joined with the microsegment-CGR tier table such that the CGR tier value is eliminated, essentially creating a combined microsegment-CGR factor table. A person having ordinary skill in the art will appreciate that abstracting the CGR factor with a CGR tier has advantages and disadvantages, including the advantage of automatically applying CGR factor changes over all microsegments simply by updating the CGR tier-CGR factor table, and the disadvantage of greater memory usage due to the CGR tier value acting as a key for the two tables. Embodiments of the disclosure include CGR tier-CGR tier factor tables that include less than 1000 tier factors, less than 500 tier factors, less than 400 tier factors, less than 350 tier factors, less than 300 tier factors, less than 250 tier factors and less than 200 tier factors.

Figure 6:
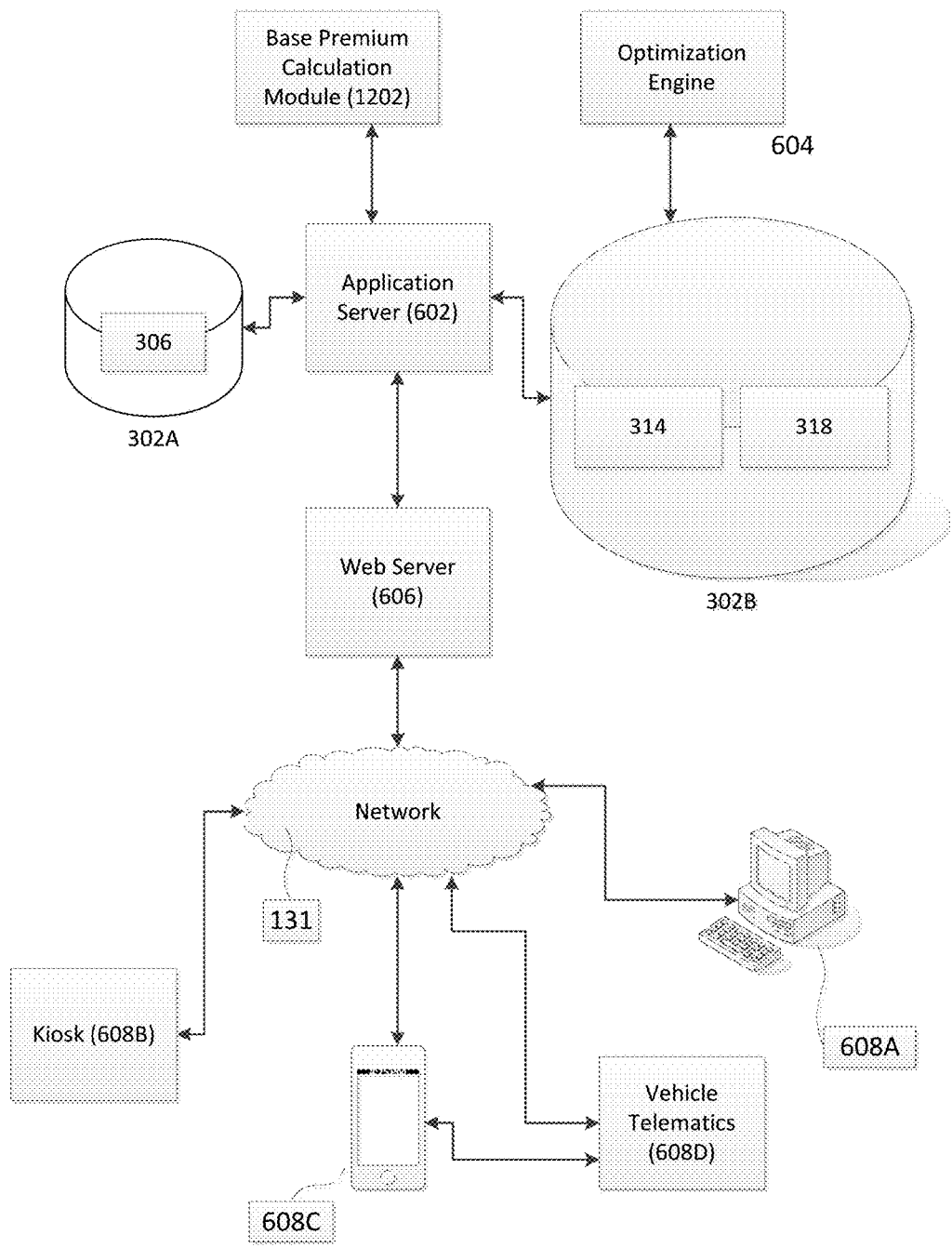
FIG. 6 shows a high-level diagram of various interactions between different system components in accordance with various aspects of the disclosure.

Referring to FIG. 6, a device (e.g., device 608A, kiosk 608B, smartphone 608C, vehicle telematics unit 608D) associated with a user may request a quote for an insurance policy (e.g., vehicle insurance, rental insurance, home insurance, or life insurance, and so on). The insurance policy may be for a renewal of an existing insurance policy, or may be for a new insurance policy. For example, the user may be operating a laptop computer 608A from their home. The laptop computer 608A may send (in step 802) a request to a web server 606 to return a price quote for a particular insurance policy. A person having ordinary skill in the art will appreciate, after review of the entirety disclosed herein, that the aforementioned request to web server 606 may include (or be associated with) information about the user, such as the user's policy number, name, address, vehicle VIN number(s), family member's information, and/or other information. For example, with an existing insurance policy, the user may simply login through the web server 606 and information about the user may automatically be associated (in step 804) with the user's request. In an example where the user does not already possess an insurance policy, the user may provide pertinent information (e.g., values corresponding to user characteristics defining microsegments, and other values) through the web server 606 prior to or concurrent to the request for a premium quote. In an alternative embodiment, a kiosk 608B may provide a user/agent means for communicating with the server (e.g., web server 606). Likewise, a telematics unit 608D in a vehicle may provide a user with a means for communicating with a server 606 to request and receive insurance premium quotes. For example, the telematics unit 608D may include a pay-as-your-drive (PAYD) feature that allows a user to request to purchase vehicle insurance before/during/after a trip.

While the telematics unit 608D is described above with respect to particular embodiments, other embodiments involving the telematics unit 608D are contemplated and disclosed herein. For example, the telematics unit 608D may measure one or more vehicle factors of the vehicle. In some examples, the telematics unit 608D may be tethered to the vehicle, e.g., through a connection with the vehicle's on-board diagnostics (OBD or OBDII) port. In other examples, the telematics unit 608D may be tethered to the vehicle through other connection means—e.g., through a smartphone 608C using a short-range wireless protocol such as Bluetooth. In yet other examples, the telematics unit 608D may comprise a plurality of sensors (e.g., GPS, accelerometer, gyroscope, etc.) that measure, in a standalone manner, the equivalent of the data previously collected through the OBD/OBDII of the vehicle. In yet other embodiments, the vehicle telematics unit 608D may be seamlessly built into a vehicle such that the components are hidden inside the vehicle, but the data measured by the vehicle telematics unit 608D is communicated through the OBD port or other means (e.g., short-range wireless, Bluetooth, etc.).

Once a request has been submitted to the web server 606, the web server 606 may submit (in step 806) some or all of the information to an application server 602 to obtain a quote/premium price for the user. In some examples, the application server 602 may be part of a CGR system in accordance with various aspects of the disclosure. As such, the CGR system may receive as input the values of those user characteristics that together define (in step 808) a microsegment. The CGR system may use these values to determine in which microsegment the policy may be placed. The steps involved in this determination process are explained elsewhere in this disclosure, thus are not repeated here. In some examples, the minimal amount of input may be provided to the CGR system such that those values required (e.g., values of a four-tuple defining microsegments) to identify the corresponding microsegment are provided, but other values corresponding to the user or the identity of the user/user policy are not provided for privacy or other reasons.

Once the microsegment is identified, the CGR system may access a microsegment-CGR tier table to identify (e.g., lookup in step 810) which CGR tier is currently assigned to the particular microsegment. Once the CGR tier (e.g., a three-digit code corresponding to tier name, in some examples) is identified, the CGR system may perform a lookup in the CGR tier-CGR factor table to identify the CGR factor value assigned to the particular CGR tier. In some embodiments, a microsegment-CGR factor table may be used in lieu of the two separate tables: microsegment-CGR tier table and CGR tier-CGR factor table. At least one benefit of such a database table configuration is enhanced speed and efficiency; meanwhile, the other configuration permits an increased level of abstraction to permit seamless changes to CGR factor values while avoiding excessive updates to a massive microsegment-CGR factor table.

After identification (in step 812) of the CGR factor value corresponding to the user associated with the requested quote for an insurance policy, the CGR system may adjust the base premium rate by the CGR factor value to arrive at the enhanced premium price for the user's policy. Based on the objective (which is described in detail herein) designated for the CGR system, the enhanced premium price may be an optimal insurance rate for the user. For example, the CGR system may receive (in step 814) the base premium rate from one of many existing computers in the prior art. Numerous formulas and processes are known by persons having ordinary skill in the art for calculating a base premium rate using numerous input factors. The CGR system performs (in step 816) an arithmetic function (e.g., multiplication) between the received base premium rate and the CGR factor value to arrive at the new premium price to quote for the user's policy. Based on whether the user is an existing customer or a new customer, this quoted price may be for a renewal period or for new insurance policy that begins at a particular date.

In another example, the CGR system may calculate the CGR optimal premium rate by multiplying the base premium, which may be sent to the CGR system from a module (e.g., a base premium calculation module), either internal or external to the CGR system, that calculates the base premium using well known formulas (e.g., an SRM6 rate formula), with the retrieved CGR factor, and then adding back in any non-applicable coverage premiums:

CGR_premium=applicable_base_premium*
CGR_factor+other_premium

Although the term "optimal rate" (or optimal premium rate) may refer to the rate (e.g., $50/month) that a user may pay for a vehicle insurance policy, the term "optimal rate" is not so limited. The term "optimal rate" may refer to other types of payments that may be made on other types of insurance policies (e.g., homeowner's insurance, personal property insurance, renter's insurance, and others). In addition, the term "optimal rate" may apply to payment types outside of the insurance industry; for example, "optimal rate" may be used in other contexts to refer to the optimal amount to charge a particular person or entity for a particular good or service.

Likewise, the term "base rate" may refer to the current premium rate (e.g., $60/month) that a user may be paying for the user's existing vehicle insurance policy. However, like with respect to "optimal rate," the term "base rate" is not so limited. In some embodiments, the base premium rate may include just the applicable coverages determined by a traditional rating plan. Then, after the base premium rate is multiplied by the appropriate CGR factor, the non-applicable coverage premiums may be added back. In other words, some portions of the user's existing premium may be unaffected, in some embodiments, by the CGR factor.

The calculated CGR premium (e.g., premium rate, or premium price) may be transmitted (in step 818) from the application server 602 to the web server 606 where it may be integrated into user-friendly content (e.g., HTML web page, etc.) for display to the user on the user's computing device 608. Alternatively, the CGR premium may be calculated and transmitted from application server 602 to another server outside of the CGR system, such as a kiosk 608B or another application server where the value may be used with other computations.

Figure 3:
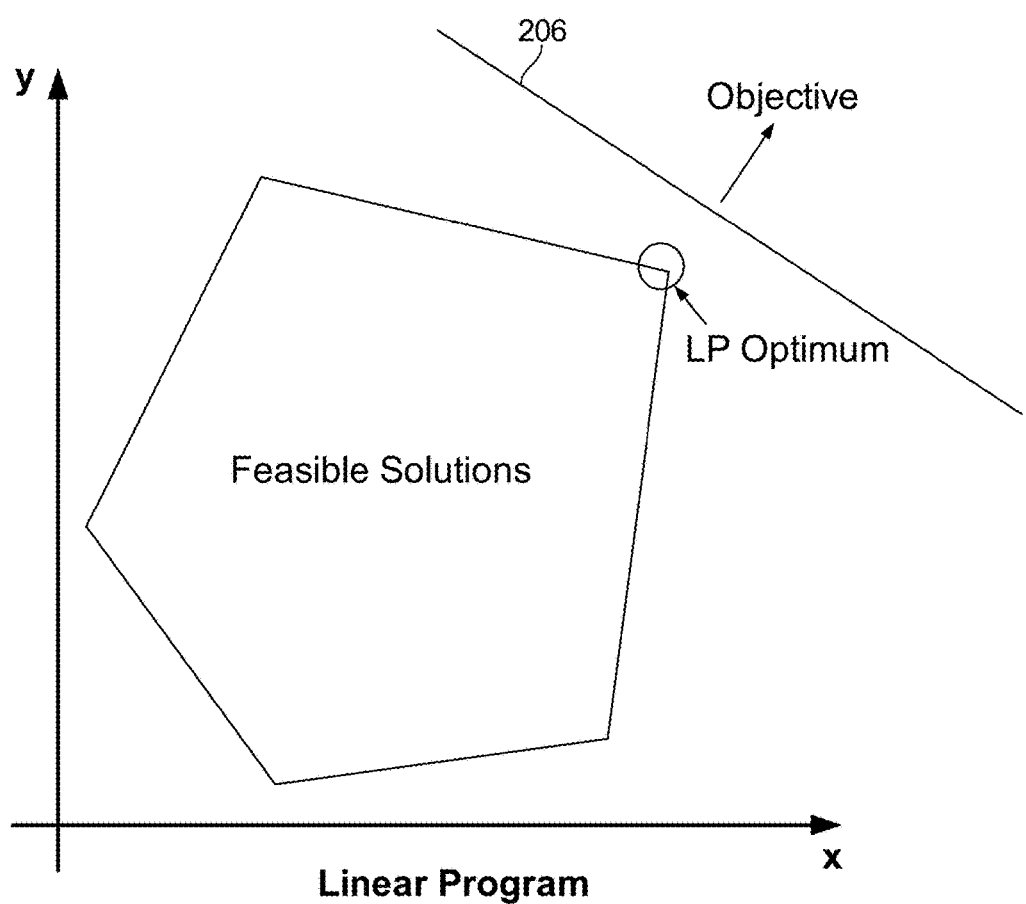
FIG. 3 is a graphical solution to a LP optimization problem in accordance with one or more aspects of the disclosure.

The preceding examples with reference to FIG. 6 presuppose that various tables and systems are in place. Meanwhile, the diagram of FIG. 3 illustrates various processes for generating one or more of these tables, including mapping each microsegment to a CGR tier. The system receives data from a data store 302 that is storing information about users, such as customers holding a policy (e.g., insurance policy) with a particular insurance company. The data may include a combination of user characteristics (e.g., the four-tuple combination described above) that together define a microsegment, or alternatively, may include a value uniquely identifying a microsegment.

In one example, referring to FIG. 3, for each microsegment the system determines whether any insurance policies exist within that microsegment. In some systems, an application server 604 may query the data store 302A for each of the microsegments to determine if any user data matches the combination of user characteristics that define a particular microsegment. For example, the application server 604 may execute a SQL query against database tables stored in data store 302A to identify those entries (e.g., rows of the database table) that match the values of the microsegment (e.g., the four-tuple combination describe above). The user data returned by the SQL query may be transmitted from the data store 302A to the application server 604 for use in computations, which are discussed in detail herein.

A person having ordinary skill in the art after review of the entirety disclosed herein will appreciate that user data transmitted to the application server 604 may include various different types of information. For example, the user data may include loss information (e.g., expected loss of the policy/policies) associated with the matched microsegment. Furthermore, the user data may include price elasticity information (e.g., what a microsegment is willing to pay) associated with the matching microsegment. Generally, almost any user characteristic that reflects the user's demand/price elasticity may be used in calculating the optimal factor for a user's insurance policy. Other examples of factors include, but are not limited to current premium, past premium changes, prior premiums going back a predetermined number (e.g., 2, 4, 6) of renewals, number of times the user has renewed their policy, which channel the user uses to purchase/renew their insurance, expected retention, expense/cost information, base premium (i.e., non-CGR premium), Such information may be useful for determining an optimal factor (e.g., by what factor to adjust a microsegment's current or quoted premium price) for an insurance policy. For example, the user data may include information about user demand, such that the application server 604 may, in some examples, consider it when assigning CGR tiers to microsegments. In addition to user data matching the microsegment, other data and/or constraints may be used by the application server 604 to compute which CGR tier to assign to each microsegment. Other examples will be apparent to a person having ordinary skill in the art after review of the entirety disclosed herein.

The application server 604 may use the aforementioned user data, inter alia, and an optimization scheme to compute which CGR tier to assign to each microsegment. In other words, the optimization scheme may be used to calculate CGR tiers for microsegments. In some examples, the optimization scheme may utilize a demand model or a loss model. These models may include up-to-date models and/or historical models to assist in calculating optimal assignments of CGR tiers in the context of a flexible scheme of objectives and constraints. In other examples, a model to predict close rate and/or a model to predict first-term retentions may be used on quotes data in accordance with the disclosure. For example, these models may assist in determining how to price empty microsegments and/or project business results. Furthermore, linear programs (LP) and known linear programming techniques may be used to solve this optimization problem.

Regarding FIG. 4 and FIG. 5, those two figures include tables of illustrative model objectives (e.g., increase renewal retention, and minimize midterm defection, and other objectives, respectively) In accordance with various aspects of the disclosure, the parameters may be used with current insurance policies to determine, for example in FIG. 4, the model to predict renewal retention is disclosed. The model shows that particular variables may be assigned a positive value for "parameter estimate," while others may be assigned a negative value. The range of values in illustrative FIG. 4 is 4.8359 to −4.5886. Likewise, for the example in FIG. 5, the model to predict midterm defection (e.g., a user leaving an insurance carrier before his/her current policy term expires) is disclosed. That illustrative model shows a range of values for "parameter estimate" ranging from 4.491 to −3.587. For example, after review of the table in FIG. 5 and the entirety disclosed herein, a person having ordinary skill in the art will appreciate that particular variables in a linear programming may be adjusted in one direction or the other (e.g., a greater positive or negative value) before submitting to an optimization engine, such as the one commercially-available from GUROBI™.

This disclosure describes, inter alia, the steps of an illustrative optimization scheme for use in assigning CGR tiers to microsegments. In doing so, in one example, a linear program may be implemented using a mathematical software package, such as MATLAB™. One or more multi-dimensional matrices may assist in the linear programming; a K×N matrix may be used, where C is a K-dimensional vector of optimization variables and there are K linear equations.

In another example, the linear program may be implemented using an optimization engine. The disclosure describes, inter alia, an application programmer's interface (e.g., Python API) that may be used to perform optimization using an illustrative optimization library (e.g., the commercially-available GUROBI™ optimizer). The GUROBI™ optimizer provides object- and matrix-oriented interfaces that are implemented as lightweight, modern APIs that may be used to build a model. For example, the Python object-oriented API of GUROBI™ may be used for running\testing models, in addition to building complex models and transitioning those models to applications. The API offers functions and syntax through which a Python program may interact with the GUROBI™ optimizer to create decision variables (e.g., "var"), objective functions, and constraints (e.g., "constr"). In addition, data coefficients, index sets, subscripts, and overloaded arithmetic operators (e.g., constraint operators, "for-all" operators, and "aggregate sum" operators) may be used in defining a model in GUROBI™. Furthermore, the model may be populated with data in various different ways. In one example, data may be copied/transferred into a .py file and importing into GUROBI™ using the "import" function of the Python programming language. Alternatively, the data may be directly imported into GUROBI™ from a database (e.g., MySQL, ORACLE™, DB2, SQL Server, etc.) or through an ODBC (e.g., Access) interface or from a spreadsheet (e.g., Microsoft Excel .xls file).

In accordance with various aspects of the disclosure, the complex challenge of assigning a CGR tier to each of over a million microsegments may be framed into a linear program using the aforementioned APIs, optimization libraries, and other components/modules. The optimization engine may provide one or more libraries of functionality that can be customized and used through an API interfacing with the Python programming code. In one example, using linear algebra notation, the objective of the linear program (LP) implemented in the Gurobi optimizer may be described as "maximize $c^T x$", and the constraints of the linear program may be described as "A x=b" (linear equality constraints), "H x<j" (linear inequality constraints), and "l≤x≤u" (bound constraints). The vector x represents the decision variables, the vector c captures the linear objective function, the matrix equation Ax=b specifies the linear constraints on x, and the vectors 1 and u give the lower and upper bounds on x. The optimization engine may (i) receive a set of "decision variables" (e.g., each of the attributes/factors associated with a microsegment, including probability of assigning a microsegment to a CGR tier), (ii) receive a linear objective (e.g., maximize retention of policies from the microsegments), and (iii) receive a set of linear constraints on these decision variables (e.g., tier-balancing of the microsegments and/or directional constraints for the microsegments). A person having ordinary skill in the art after review of the entirety disclosed herein and the reference manual, "Optimizing LP Problems: a primer on the basics of linear programming," which is publicly accessible at Gurobi's website (i.e., http://www.gurobi.com/resources/getting-started/lp-basics) and a copy of which is submitted in an Information Disclosure Statement concurrent with this disclosure and is herein incorporated by reference in its entirety, will appreciate that numerous techniques may be employed in achieving the objectives of the LP. FIG. 3 is a graphical representation from the aforementioned Gurobi website illustrating a LP optimization solution showing how the optimum solution can be identified based on a defined objective 206.

In one example in accordance with various aspects of the disclosure, the optimization variables may be a binary variable (e.g., "x_cust_tier" variable), of which there is one for each microsegment and CGR tier combination, and takes the value "1" if the user occupies the tier, and "0" if the user does not occupy the tier. Thus, this transforms the problem into a binary assignment problem, which is a subtype of an integer linear programming problem. This type of problem can be very difficult and computationally intensive to solve. However, to make the problem solvable, we may tweak the problem by slightly relaxing the problem definition. Instead of restricting the "x_cust_tier" variable to take on only the two values 0 and 1, we define the variable to allow it to take any real number value between (and including) 0 and 1, keeping the constraint that the assignments for each customer must sum to one:

sum(x_cust_tier for tier in framework)==1

Figure 7:
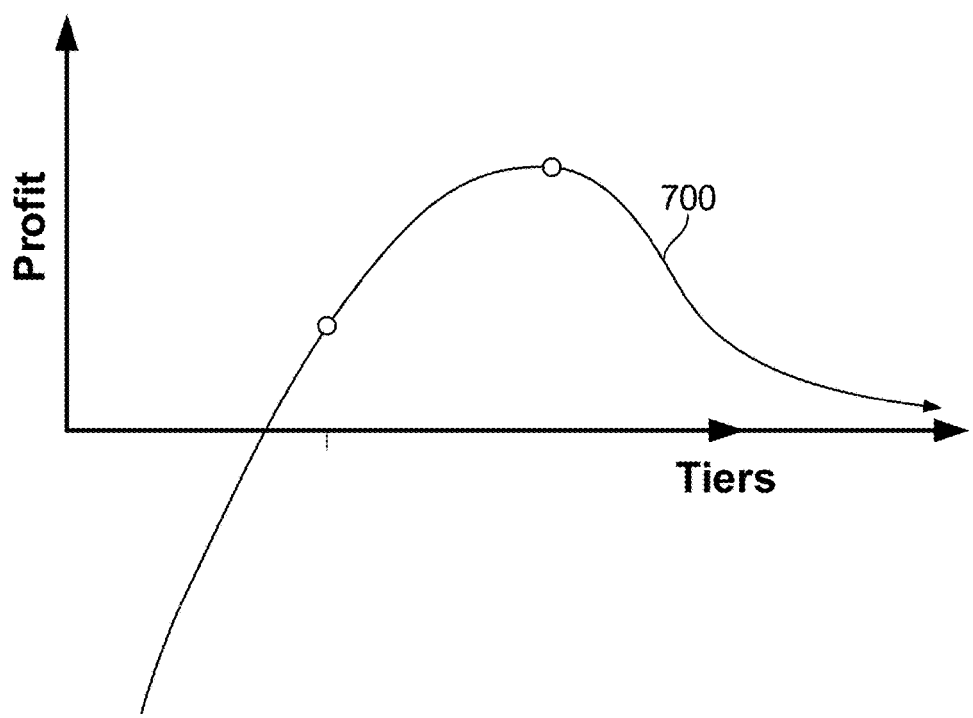
FIG. 7 illustrates a graphical representation of a price-tier correspondence used with operation moding to identify a suitable complementary group rating (CGR) tier for a microsegment.
Figure 8:
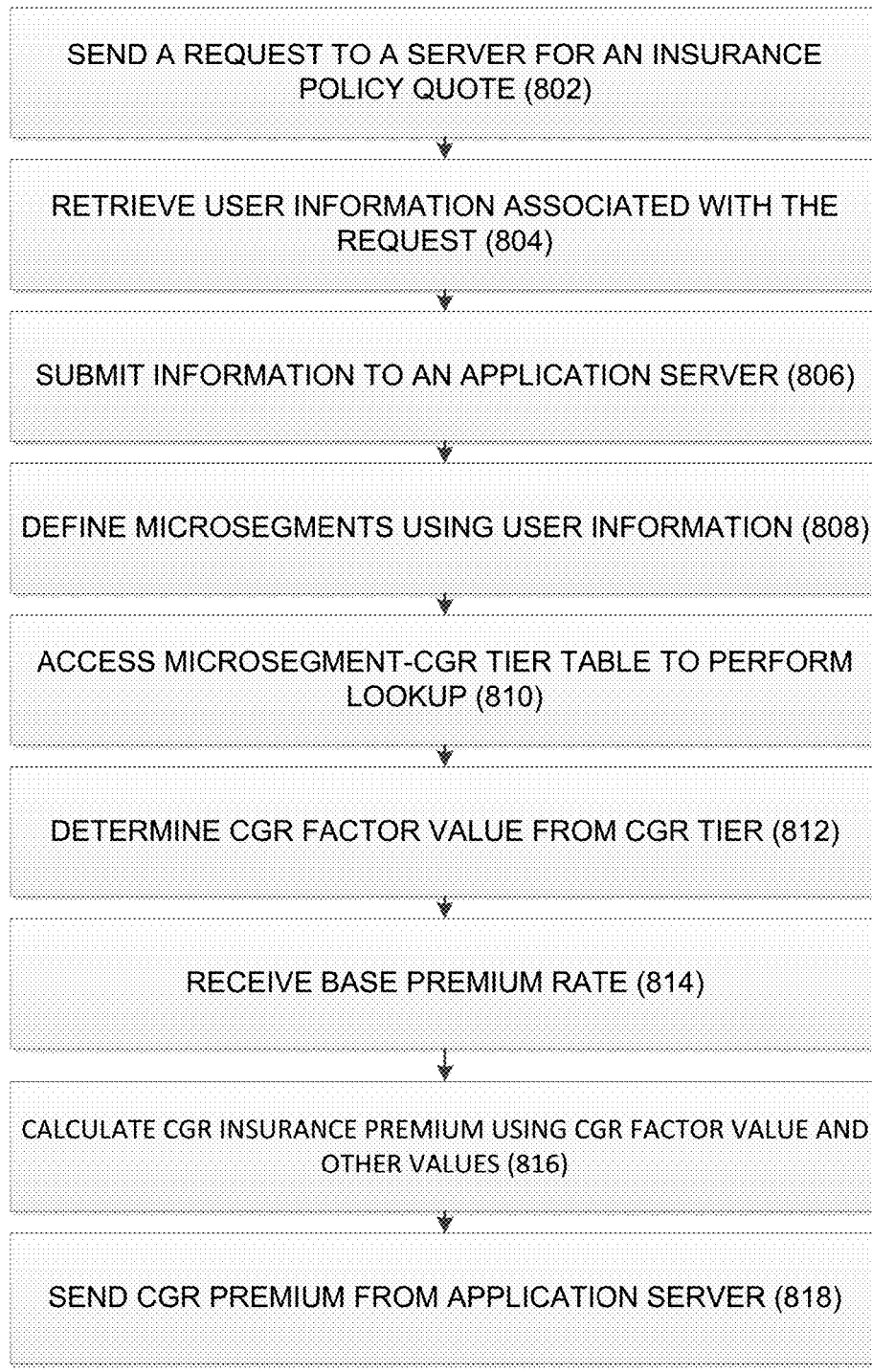
FIG. 8 is a flow diagram illustrating an example method of requesting premium price quotes, according to one or more aspects of the disclosure.
Figure 9:
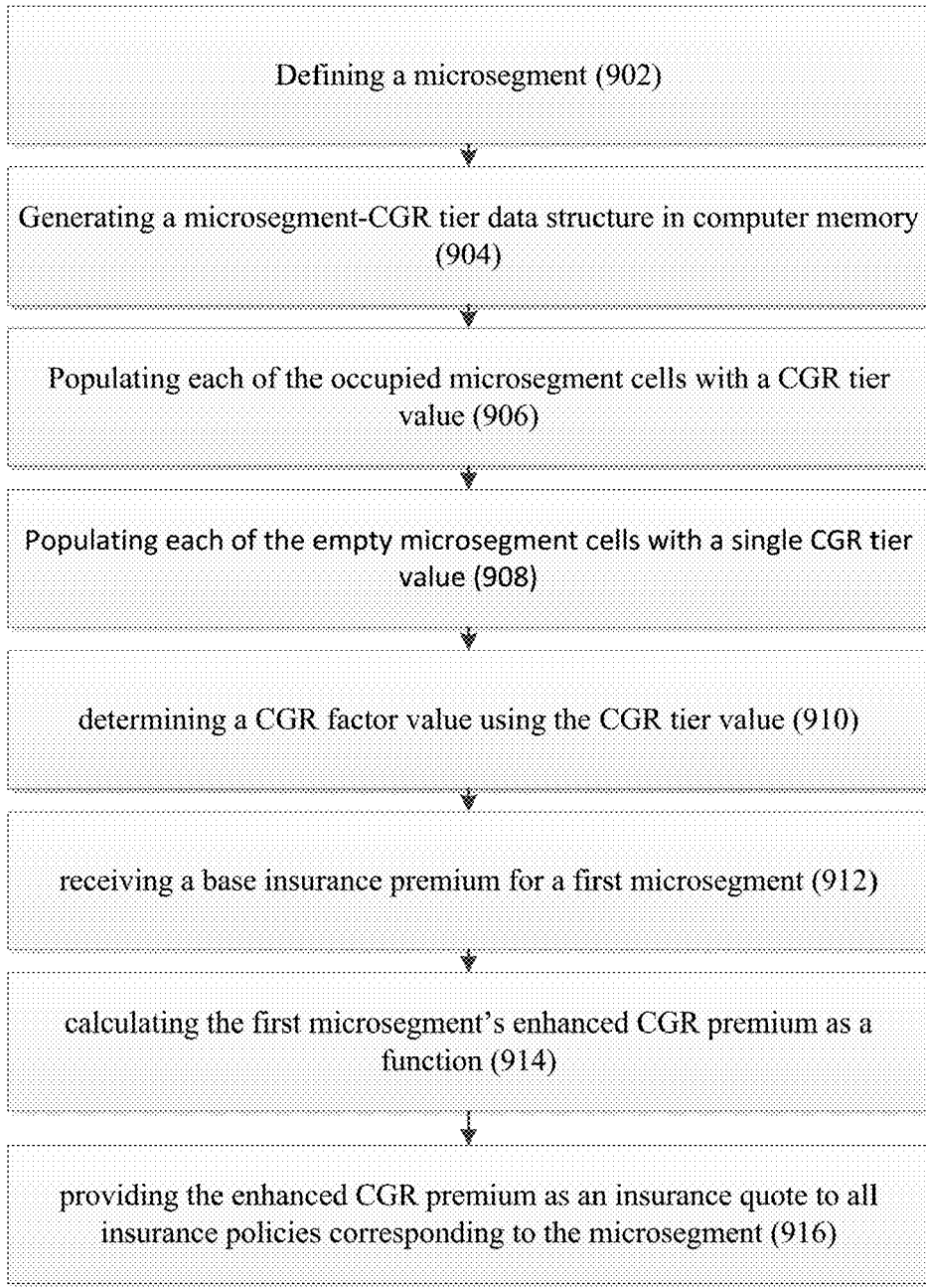
FIG. 9 is a flow diagram illustrating an example method of generating a microsegment-CGR tier table using an optimization engine, according to one or more aspects of the disclosure.

In other words, instead of assigning each microsegment a single CGR tier, the system now assigns each microsegment a probability distribution of CGR tiers. In turn, this simplifies the problem such that it is now a pure linear programming problem, for which there are efficient and accurate solution procedures even when the problem has millions of variables. Notwithstanding, for practical purposes the system cannot assign each microsegment a distribution of CGR tiers. Rather, linear programming techniques, such as operation moding (e.g., taking the highest probability), may be used to identify which microsegments are most appropriate assigned, with almost 97% accuracy, to a particular CGR tier, as depicted in the graph 700 in FIG. 7. In practice, the mode of the microsegment solution distribution is taken as its assigned CGR tier. While, a priori, this could be disastrous if the variance or skewness of the resulting solution distributions were large, in practice, this has been found to not be the case. Moreover, machine learning techniques may be used including, but not limited to, vector machines, neural networks, neuro-fuzzy systems, Bayesian learning, regression, clustering, representation learning, and the like, to refine the accuracy with which particular CGR tiers are identified for microsegments.

In addition to providing an efficient and accurate solution procedure, linear programming also permits the definition of an objective function. In other words, the assignment of CGR tiers to microsegments may be optimized per an objective function. In one example, the objective of the linear program may be defined to maximize retention of existing policies, increase the book of business (e.g., increase/maximize the acquisition of new insurance policies, maximize policies in force), maximize customer value, maximize/minimize premium change on renewal, or other goals. "Book of business" refers to the collection of all the tiers that constitutes the total of all insured individuals.

The CGR system may use data about a microsegment's demand when selecting a final CGR rate (e.g., optimization). This may be accomplished by running an optimization scheme, as generally described above, to produce a final microsegment-CGR tier table. For example, an illustrative CGR system may associate demand data to each microsegment. In some instances, the microsegment may include one or more actual users, while in other instances the microsegment may be associated with quote data or data about a hypothetical user. This demand may be a function of both static user characteristics and the price (e.g., premium) that the user is charged:

demand(customer,price)=some_function_of_customer_charecteristics(customer,price)

In one embodiment, the demand function may be constructed as a logistic model. However, a person having ordinary skill in the art after review of the entirety disclosed herein will appreciate that in the context of the CGR system, a demand function may take numerous other functional forms.

The CGR system may use the demand data to calculate the expected value for particular insurance policy statistics (e.g., policy features/options) at various price points:

expected_profit(cust,price)=demand(cust,price)*(premium(cust)−losses(cust))

expected_num_items(cust,price)=demand(cust,price)*num_items(cust)

These values may be used to calculate expected values for the entire book of business:

expected_profit(book,prices)=sum(expected_profit(cust,prices(cust)) for cust in book)

expected_num_items(book,prices)=sum(expected_num_items(cust,prices(cust)) for cust in book)

For example, either of these expected values may be used as an objective function for the CGR optimization scheme.

In practice, the CGR system generates a CGR tier-CGR factor table with a fixed number of CGR tiers and assigns each CGR tier a CGR factor value:

| Illustrative CGR Tier-CGR Factor Table | |
|---|---|
| CGR Tier | CGR Factor |
| TGS | $1.01^{(-100)}$ |
| BFD | $1.01^{(-99)}$ |
| . . . | . . . |
| WIZ | $1.01^{99}$ |
| MAG | $1.01^{100}$ |

The CGR tier-CGR factor table may provide a lookup from the CGR tier (e.g., an arbitrary three-character tier code or other value) to the CGR factor (e.g., a numeric value that can be incorporated into the premium calculation for the insurance policy). Another example of a CGR tier-CGR factor table is illustrated in Table 4, above.

For each microsegment, in each tier, the system calculates a price point in a similar way to how the final premium is calculated:

CGR_premium(CGR factor)=offered_base_premium*CGR_factor+other_premium

The CGR system can score, at each relevant price, the demand and the relevant expectations. In other words, the system may score demand and expectations for each microsegment in each tier:

|  | Demand | | Expected Profit | | Expected Num-Items | |
|---|---|---|---|---|---|---|
| Customer | TGS | ... MAG | TGS | ... MAG | TGS | ... MAG |
| 00000001 | .833 | ... .950 | 200 | ... 75 | 2.4 | ... 2.0 |
| 00000002 | .902 | ... .993 | 30 | ... −123 | .7 | ... 1.2 |
| 00000003 | .756 | ... .888 | 575 | ... 200 | 3.4 | ... 3.0 |

With these computations completed, the CGR system may identify and store an objective function for the CGR optimization problem. For example, if the CGR system is optimizing for a particular objective, then an objective may be configured in the CGR system.

In such an example, an "x_cust_tier" variable may be the tier assignment variable, and it may take the value '1' or '0' depending on whether a particular microsegment is or is not assigned the given CGR tier. Since the microsegment cannot occupy two different tiers at the same time, an implicit constraint is created for the CGR system:

sum(x_cust_tier for tier in framework)==1

In other words, for each microsegment, exactly one of the variables "x_cust_tier" takes the value 1, and all the others take the value 0.

If a CGR optimization is run on the above objective function, it will find the optimal premium for each microsegment independently, weighting the competing influences of each microsegment demand and charged premium, finding the charged premium that achieves the objective function.

In practice, constraints are imposed that tend to group microsegments together and take away from a truly individual, optimization problem. Below are described three such constraints: tier balancing constraint, directional constraint, and collision constraint (e.g., collision resolution); however, a person having ordinary skill in the art after review of the entirety disclosed herein will recognize that there may also be various other constraints. For example, a new impact constraint may measure the impact on the user upon renewal. In some examples, such a constraint may be used to limit change (e.g., to no more than 10% increase in policy premiums upon renewals, no more than X % change in premiums upon renewals, etc.) For example, a large premium increase might trigger a large volume of calls into a insurance agent's office to inquire about the abrupt increase, even if the demand curve/price elasticity information associated with users of that insurance agent would suggest otherwise. As such, a new impact constraint may also be included, in some examples, in accordance with various aspects of the disclosure.

Tier Balancing Constraint.

The tier balancing constraint is an actuarially imposed condition that is aimed at justifying the aggregate amount of premium being charged in each of the CGR tiers. Recall that each CGR tier has an associated CGR factor, for example, CGR tier MAZ may have CGR factor 1.01. There is one balance constraint for each CGR tier, and the constraint for CGR tier MAZ then may have the form:

sum(offered_premium(cust) for cust in MAZ)/sum(expected_losses(cust) for cust in MAZ)==1.0 or alternatively in a more optimization friendly form:

sum(offered_premium(cust) for cust in MAZ)−
1.0*sum(expected_losses(cust) for cust
in MAZ)==0

For actuarial purposes in some examples, each microsegment may be charged the average of the expected losses of all microsegments in the tier. As a result, some microsegments may pay more than their expected loss, while some may pay less.

In an example, the tier balancing constraint can require that the sum of all premiums for all policies, insured or customers in a particular tier are equal to the total expected losses for all policies, insured of customers within that particular tier, plus an optional business factor such as profit or expenses. The following equations illustrate how, in one example, the tier balancing constraint of the optimization scheme may use expected loss (i.e., pollux in the equation) and base insurance premium rate (i.e., prop):

$a_{ij}$ = prob policy $i$ will be in tier $j$    Equation #1 for all tiers $j$, $$\frac{\sum_{policies\ i} a_{ij}\ \text{pollux}}{\sum_{policies\ i} a_{ij}\ \text{prop}_i\ CGR_j} = 1$$

Given an amount of slack s, for all tiers j, $$\frac{\sum_{policies\ i} a_{ij}\ \text{pollux}_i}{\sum_{policies\ i} a_{ij}\ \text{prop}_i\ CGR_j} \leq 1 + s$$    Equation #2 and $$\frac{\sum_{policies\ i} a_{ij}\ \text{pollux}_i}{\sum_{policies\ i} a_{ij}\ \text{prop}_i\ CGR_j} \geq 1 - s$$

Directional Constraints.

The directional constraint is also an actuarially imposed condition that is primarily aimed at ensuring that when a microsegment is placed into a CGR tier, the corresponding CGR factor applied to the microsegment causes the associated user insurance policy/policies to move the user policy closer to the CGR tier indicated by the user's losses. In practice, each microsegment may have an "indicated" price that is based on the best possible estimate of the associated insurance policies' expected losses. For various reasons, the base premium quotes for a microsegment may be less than or greater than these expected losses. In one example, the expected loss, for comparison, are balanced in aggregate to be on the same rate level as the premium. A person having ordinary skill in the art after review of the entirety disclosed herein will appreciate that there are numerous variations of the directional constraint: is overshooting allowed.

In one example in accordance with various aspects of the disclosure, the CGR system may involve adding many constraints for each microsegment. The CGR system may set the CGR tier assignment variables to zero if the tier is not available to the microsegment:

```
for cust in book:
    loss_diff = offered_premium(cust)- expected_losses(cust)
    if loss_diff > 0: # Upwards movement is indicated
        for tier in framework:
            if CGR_premium(cust, tier) < offered_prem(cust):
                x_cust_tier = 0
```

```
if loss_diff < 0: # Downwards movement is indicated
    for tier in framework:
        if CGR_premium(cust, tier) > offered_prem(cust):
            x_cust_tier = 0
```

Collision Constraints. Recall that CGR factors are not, in fact, set on by policy basis;
there is a CGR factor associated to each microsegment. Referring to Table 3 (above), we see that User 00001 and User 00002 collide and are placed into the same microsegment bucket. Collisions each impose additional constraints on the optimization: each customer participating in a collision should be assigned the same CGR tier/factor:

for (cust1, cust2) in collision:
    for tier in framework:

$x\_cust1\_tier = x\_cust2\_tier$

In the first few sections of this disclosure we described some illustrative structures of a CGR system. That CGR system populates the cells of the microsegments-CGR tier table differently based on whether the microsegment is associated with any existing users (e.g., a renewal policy on the books), or if the microsegment does not correspond to any existing user (e.g., a new customer requesting a quote).

Referring to FIG. 3, if the application server 604 finds, as a result of its query, that the data store 302A contains user data corresponding to a particular microsegment, then the application server 604 may input the associated user data into the model being constructed by the optimization engine. As described above, the model may be populated using a .py file (e.g., a file formatted in compliance with the optimization engine's requirements), through a data transfer from a data store (e.g., database server) using an ODBC interface, from a spreadsheet, or some other means. Referring to FIG. 2B, the "populated" column 202 may be updated to indicate whether user data corresponding to the particular cell was found or not. FIG. 2B is an illustrative table 200 showing aspects of a CGR optimization solution.

For those microsegments where associated user data exists (e.g., column 202 indicates yes), the CGR system (e.g., application server 604) may analyze the model through the lens of the optimization scheme described herein to arrive at the optimal placement of microsegments into CGR tiers to serve the designated goal(s) of the objective function of the optimization scheme. The calculations may result in the values stored in the "indicated factor" column 204 of FIG. 2B. In one example, the CGR system may use, inter alia, the expected loss information of the policy associated with the particular microsegment and the price elasticity information of the policyholder (e.g., what the user is willing to pay) to calculate an indicated adjustment factor (e.g., the value in column 204). A person having ordinary skill in the art after review of the entirety disclosed herein will recognize that prior art systems already exist for determining the price elasticity information of a user based on the user's characteristics (e.g., income level, net worth, salary, etc.), and for determining the expected loss of a policy based on statistical modeling and historical data. As such, these prior art systems may be relied upon to calculate the expected loss information and price elasticity information, and then these values may be provided to the CGR system for the optimization scheme described herein. An independent "indicated factor" can be determined for each populated microsegment (i.e., microsegments where user associated data exists). Two microsegments can have the same "indicated factor." However, the determination of the indicated factor is independent for each populated microsegment, in an example.

Once the indicated factor 204 has been calculated, the application server 604 identifies which CGR tier (e.g., tiers 1, 2, 4, 5, 6, 8, and 9 in FIG. 2B) is best suited for the indicated factor 204 while meeting the desired optimization scheme of the CGR system. For example, "cell 1" in FIG. 2B has an indicated factor 204 of 1.00. Meanwhile, CGR tier 1 also has a CGR factor value of 1.00. As such, the CGR system assigns that microsegment to CGR tier 1, which has a CGR factor of 1.00. As explained above, the CGR tier to CGR factor mapping may be maintained in a CGR tier-CGR factor lookup table in the CGR system. In another example, "cell 9" in FIG. 2B has a calculated indicated factor 204 of 1.43. Meanwhile, CGR tier 5 has a CGR factor value of 1.40 and CGR tier 6 has a CGR factor value of 1.50. As such, the CGR system must select between the two CGR tiers. In one example, based on its objective function and its numerous constraints, the application server 604 of the CGR system may select CGR tier 5 and assign it to the microsegment. In a different example involving "cell 15," which has an indicated factor of 1.68, the CGR system, based on its objective function and its numerous constraints, selects CGR tier 8, which has a higher actual factor value of 1.70 than the calculated indicated factor. A person having ordinary skill in the art after review of the entirety disclosed herein will appreciate that the selection of CGR tiers for a microsegment are based on numerous consideration, including the optimization scheme (including objective function, constraints, and other parameters) of the optimization engine of the application server 604 of the CGR system. In an alternative embodiment, indicated factor values may simply be stored in their corresponding microsegment without directionally adjusting the value of the indicated factor. As such, the "microsegment-CGR tier" table may effectively serve as a microsegment-individual factor table. Such a table may be used, in one example, to calculate a user's insurance policy premium.

As explained above, that CGR system populates the cells of the microsegments-CGR tier table differently based on whether the microsegment is associated with any existing users (e.g., a renewal policy on the books), or if the microsegment does not correspond to any existing user (e.g., a potential new customer). For example, in some regions (e.g., state of Virginia), the microsegment-CGR tier table may contain about 400 million microsegments, however, only about 130,000 of those may be associated with an existing customer policy and another 65,000 may be associated with a quote (e.g., quote data generated by a request from a user associated with a particular microsegment). Meanwhile, the remaining microsegments may be empty of user data or quote data.

Referring to FIG. 3, if the application server 604 finds, as a result of its query, that the data store 302A does not contain user data corresponding to the particular microsegment, then the application server 604 may calculate an indicated adjustment factor for a microsegment in one of several different ways. In one example, the CGR system may randomly assign an indicated adjustment factor 204 since in some cases the CGR system may have no data available to know the loss or demand for an empty microsegment. In some instances, the assignment may be at or around a predetermined percentage (e.g., 20% of the current premium rate or some random distribution around 20%) After the user purchases the insurance policy, the CGR system may then update the microsegment to reflect the appropriate indicated factor value 204 based on actual user data.

In other examples, the CGR system, to the extent that it can predict demand of the microsegment, may use the user characteristics defining the microsegment to calculate an indicated factor value/amount 204. In yet another example, if quote data exists associated with the microsegment, then the CGR system may use the historical/collected quote data to calculate an indicated factor value 204. However, in some examples, the CGR system may limit the use of quote data to only the data from the preceding six-month period (or some other period of time). Similar to described above, the CGR system may retrieve the quote data from a data store (e.g., data store 302A) and send it to the application server 602 for input into a model being constructed by the optimization engine at application server 604.

Regarding the optimization scheme of the CGR system, since these "open cell" microsegments (e.g., empty microsegments) are not associated with an existing policy, they do not affect the overall book value of the objective function and associated constraints (e.g., actuarial balancing, etc.) Recall, the overall book value, in some embodiments, requires that the sum of estimates of losses for all policies equal the sum of what is charged to all policies plus factors such as costs to manage policies and allowed profits. Because no policy is associated with an empty cell (i.e., "open cell" microsegment), almost any value may be assigned to the cell without affecting the overall book value. In short, all open cells may be assigned to the same CGR tier in some embodiments (not shown in FIG. 2B.) In a few examples, all cells not assigned with an existing policy or customer can be assigned to a predetermined CGR tier that corresponds to a CGR factor value.

Regarding the assigning all open cells to the same CGR tier approach, this approach is particularly useful in embodiments where the CGR system uses historical quote data to optimize the CGR system. Unlike with renewals, it is not sufficient to simply take a book of historical quotes and use them in the optimization in the same way as renewals; this would create assignments for all the microsegments represented in the historical book, but the quotes that come in the future will almost certainly not occupy these same microsegments. As such, since empty microsegments do not have a demand score, the CGR system would not differentiate between them in the optimization; thus, an option for optimizing quotes is to then use historical quotes data to assign all the un-occupied microsegments to the same CGR tier.

In one embodiment, each empty cell may be considered as a potential for a quote. Practically, the quote data is retrieved from the data store and imported into the model for the optimization scheme and all assigned to the same CGR tier (i.e., resulting in a single, giant collision):

for (quote1, quote2) in quote_book:
    for tier in framework:

$x\_quote1\_tier = x\_quote2\_tier$

Afterwards, all the currently un-occupied microsegments may then be assigned to the optimal quotes tier. Once quote data is imported into to the model for an optimization scheme, additional objectives may be considered for objective functions of the optimization scheme. For example, a new "expected number of items" objective may be indicated:

$obj = (sum(x\_cust\_tier * expected\_num\_items(cust,tier)$
    for cust in renewal_book for tier in framework)

$+ sum(x\_quote\_tier * expected\_num\_items(quote,tier)$
    for quote in quote_book for tier in framework))

A person having ordinary skill in the art after review of the entirety disclosed herein will appreciate that although the preceding is provided as an illustration of one embodiment of in accordance with various aspects of the disclosure, other variations are contemplated and considered disclosed herein.

Figure 10:
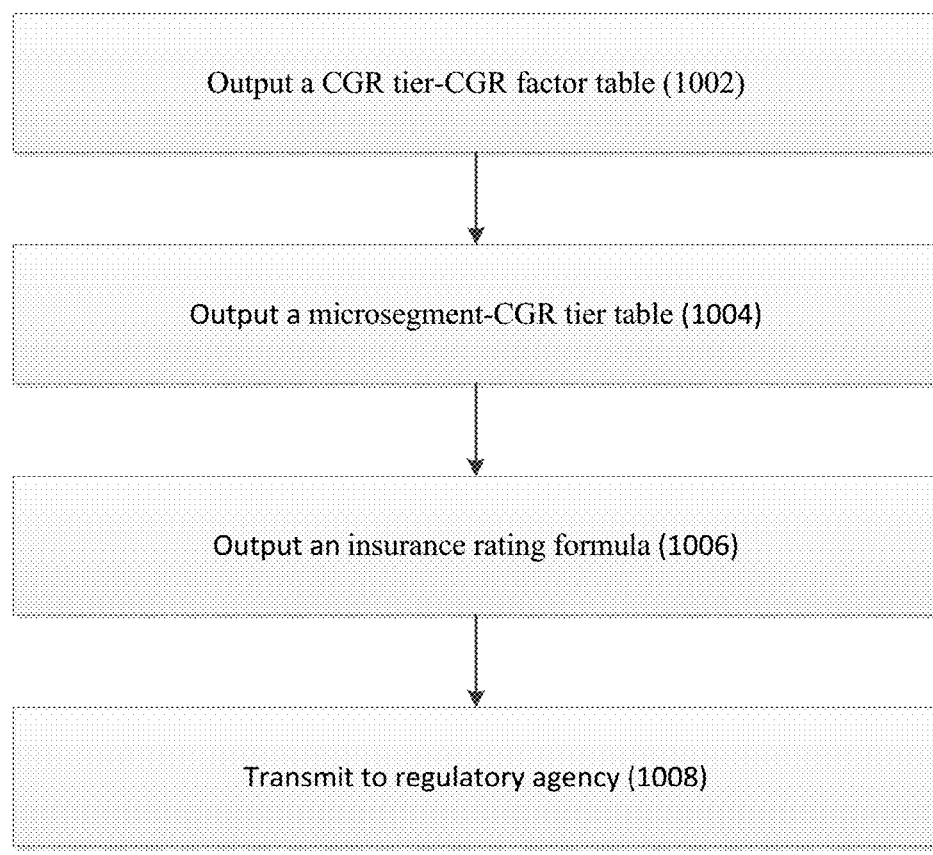
FIG. 10 is a flow diagram illustrating an example method of generating information for submission to a regulatory agency, according to one or more aspects of the disclosure.

Referring to FIG. 10, at periodic intervals of time, the CGR system may generate an output for sending to a regulatory agency (e.g., a government agency that oversees insurance companies, an internal department within an insurance company that audits internal functions/operations, or other entity). The output may comprise a CGR tier-CGR factor table (in step 1002), which identifies the mapping between tiers and their insurance rating factor values; a microsegment-CGR tier table (in step 1004), which identifies the mapping between microsegments and CGR tier names; and/or an insurance rating formula (in step 1006). The insurance rating formula, which was described above, may define the calculation of the CGR optimal premium rate by multiplying the base premium, which may be sent to the CGR system from a base premium calculation module, with the CGR factor value and then adding back in any non-applicable coverage premiums:

$CGR\_premium = applicable\_base\_premium * CGR\_factor + other\_premium$

An example of an insurance rating formula in the prior art is the SRM6 rate formula, which is well known in the art. The CGR system may output these tables and other information for transmission (in step 1008) to the regulatory agency. In some instances the transmission may be solely electronic means (e.g., computer-to-computer over the Internet), or by physical means (e.g., the CGR system transmits to a printing device that generates a report that can be mailed to the regulatory agency). In other examples, other information or data from the CGR system may be included in the generated output, or some of the information identified above may be optional and omitted from the output.

The aforementioned report may be generated and sent to a regulatory agency at a periodic interval. The information in the report may change over time. For example, with respect to the microsegment-CGR tier table, the factors in the cells may change with some frequency, e.g., every 3 months or 6 months as new customers purchase insurance policies, and new customers transition to existing customers whose indicated factor 204 calculation may be performed based on at least some real user data instead of merely quote or other data.

Pre-Calculated Insurance Premiums and/or Factors.

Figure 13:
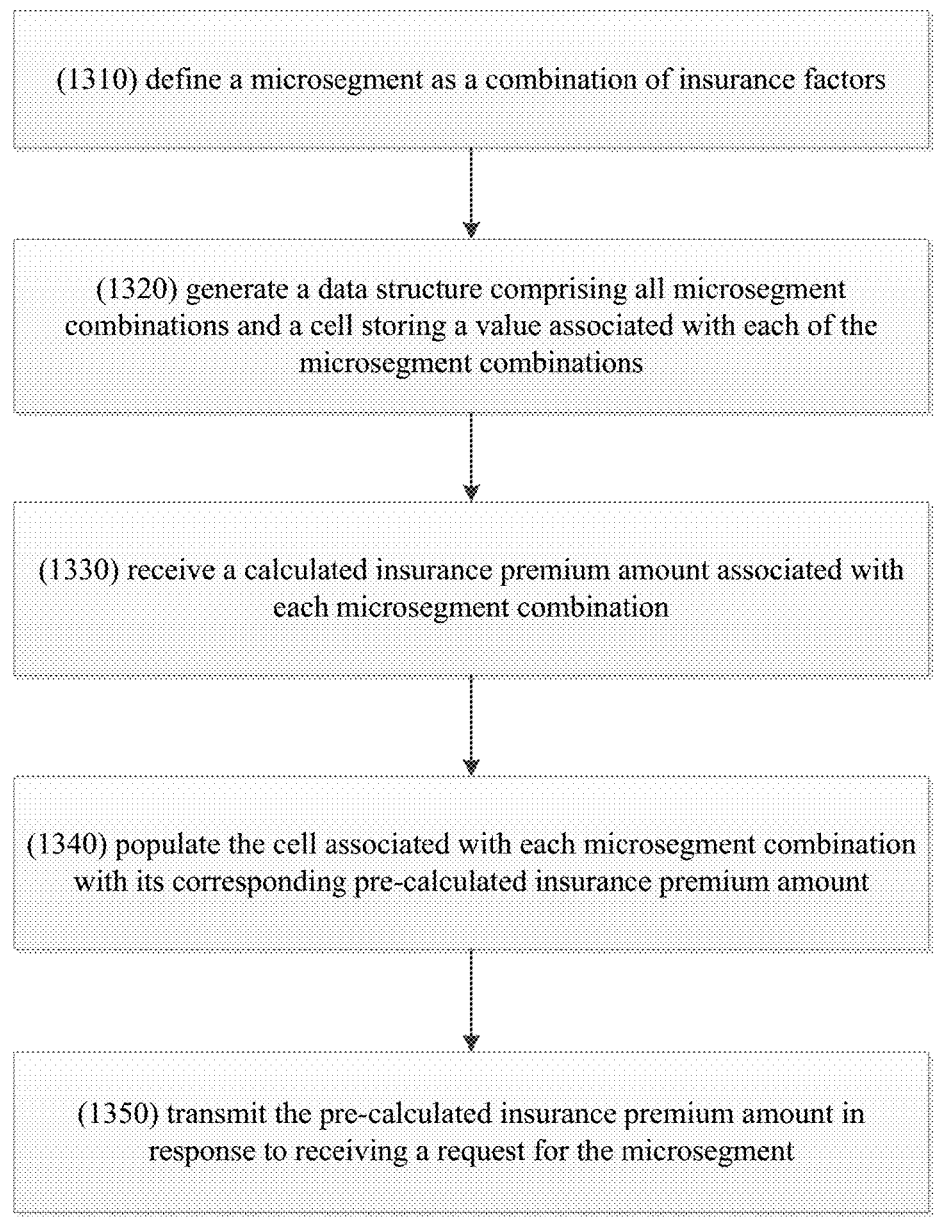
FIG. 13 is a flow diagram illustrating an example method of providing an insurance premium amount in accordance with one or more aspects of the disclosure.

Referring to FIG. 13, in accordance with various aspects of the disclosure, a method is disclosed for calculating a premium for an insurance policy. The method may be performed by a computerized apparatus including a processor and a memory unit storing non-transitory computer-executable instructions that, when executed by the processor, may cause the apparatus to: define (step 1310) a microsegment as a combination of insurance factors; generate (step 1320) a data structure in memory comprising all microsegment combinations and a cell storing a value associated with each of the microsegment combinations; receive (step 1330) a calculated insurance premium amount associated with each microsegment combination; populate (step 1340) the cell associated with each microsegment combination with its corresponding pre-calculated insurance premium amount; and/or transmit (step 1350) the pre-calculated insurance premium amount in response to receiving a request for the microsegment. The spirit of the disclosure contemplates one or more of the aforementioned steps being optional, combined/merged, and/or performed in a different order than illustrated in FIG. 13.

In one embodiment in accordance with the disclosure, an engine-less insurance rating module 1102 is disclosed. The module 1102 may be located at an application server 602 or other machine. The engine-less insurance rating module 1102 may store (or cause to be stored) pre-calculated insurance premium amounts for all possible combinations of the plurality of insurance factors (e.g., characteristics) used in calculating a user's insurance premium amount (or insurance rating score). An insurance company may consider a large number of factors (e.g., thirty or more, twenty or more, four or more, etc.) for each user's insurance policy.

For example, to calculate an insurance premium amount for a particular insurance policy, some insurance companies consider factors such as a territory factor (e.g., a zip code/location of an asset, British royal mail codes, European postal codes, or other location information), age factor (e.g., number of months in the life of a person or asset), gender, type of home, cost of home, vehicle factor, insurance score factor, claim history factor, and/or other factors known to a person having ordinary skill in the art. In some examples, factors may be provided with an individual score, thus the factor of age may be scored, for example, from 1.0-4.5 depending on a person's age. The appropriate value for the factor may be calculated by performing an arithmetic operation, such as a user's actual age divided by a particular number or some other arithmetic (e.g., mathematic) function. An example of an insurance rating formula commonly used by insurance companies is the SRM6 rate formula.

As a result, the search module 1108 of an engine-less insurance rating module 1102 may access a massive data structure in computer memory used to store the possibly millions of combinations resulting from the combination of a plurality of insurance factors. With all possible combinations of the insurance factors pre-calculated and recorded in the data structure, the system effectively includes an engine-less insurance rating module 1102 because no arithmetic calculations are required to be performed by the search module 1108 on the insurance factors associated with the user that are received from the input module 1116. Rather, the search module 1108 may be provided, through an input module 1116, with the values of the insurance factors associated with the user; and the module may output, through an output module 1118, an optimal insurance premium amount (e.g., in the form of an insurance premium amount quote) for the user's insurance policy. The search module 1108 may access the data structure to retrieve the pre-calculated value corresponding to the particular inputted combination of values for the insurance factors. Therefore, in the preceding example, no arithmetic calculations are required to be performed on the inputted insurance factors by the search module 1108.

In the preceding example, the search module 108 may access data stored in memory to retrieve a pre-calculated value corresponding to the particular inputted combination of values for an insurance factor. The search module 108 may utilize one or more search methods known in the art, such as sharding, sorting, distributed searching, and others, for locating and retrieving values from a massive data store. Moreover, in some embodiments distributed searching may be combined with or complemented by sharding (e.g., index sharding) techniques. In one example, Solr, or another comparable system (e.g., a whole index replication system), may be used with or in the search module 108 to query a single shard of an index split into multiple shards, and distribute the query to the other shards, then merge/integrate results. Various aspects may be incorporated into this distributed indexing technique, such as a round-robin approach, hashing approach, a random distribution approach, and/or other approaches. Moreover, the distributed searching may be configured with desirable concurrency and thread-pooling settings to allow, for example, for finer grained control over throughput, latency, and other performance metrics and to avoid a distributed deadlock scenario.

In an alternate embodiment involving the "engine-less" insurance rating module, the insurance rating module 1112 may output, using an output module 1118, a value that is directly used to calculate the optimal insurance premium amount (e.g., insurance premium amount quote) for a user's insurance policy. For example, the outputted value by the output module 1118 may be the value of a single insurance factor (e.g., a CGR factor) that may be multiplied with a base insurance premium to calculate the optimal insurance premium amount. In such an embodiment, the insurance rating module 1112 may perform the multiplication operation (e.g., arithmetic step) inside and/or outside of the module 112 in various embodiments. For example, the arithmetic operation(s) may be performed by the output module 1118, or may Although such an illustrative module 1112 is not a truly "engine-less" insurance rating module, this disclosure contemplates varying degrees of arithmetic computations in a hybrid approach where some or all of the arithmetic computations are eliminated. For example, in some examples, a group of insurance factors (e.g., personal insurance factors) may be grouped together and treated as a single, new factor with a corresponding pre-calculated insurance premium amount.

In the preceding example, the combination of a plurality of insurance factors may be referred to as a "microsegment." A microsegment may include a predefined combination of characteristics (e.g., insurance factors) that, taken together, define a "N-tuple" in the massive data structure in computer memory. For example, assume the four-tuple combination of characteristics: zip code, birthday (e.g., number of months of life), years with prior carrier (YPC), and oldest user's age on the insurance policy, define a microsegment. Moreover, assume that there are "V" possible values for the zip code characteristic, "W" possible values for the birthday characteristic, "Y" possible values for the YPC characteristic, and "Z" possible values for the oldest user's age characteristic. As a result, the number of microsegments stored in the massive data structure in memory may be as large as the number equal to V times W times Y times Z. With reference to the embodiments involving FIGS. 11A, 11B, 12, and/or 13, "microsegment" may be used to generally refer to any N-tuple of characteristics (e.g. insurance factors) with their corresponding values.

Figure 11A:
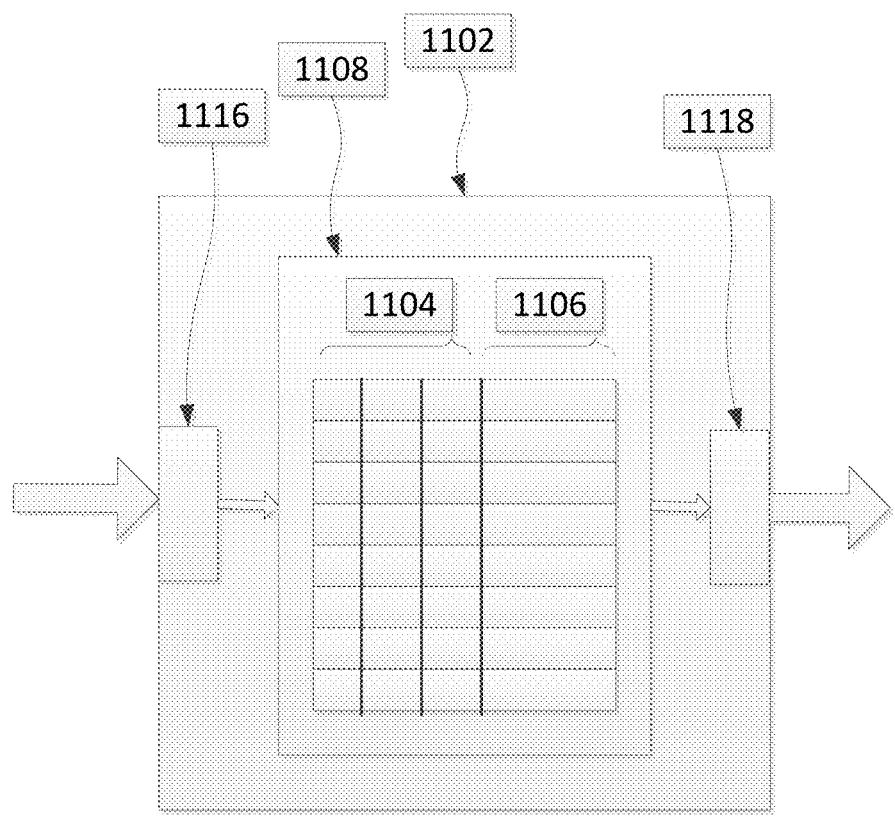
FIG. 11A and FIG. 11B illustrate an overview of various interactions between different system components in accordance with various aspects of the disclosure.

Referring to FIG. 11A, in various embodiments in accordance with aspects of the disclosure, the massive data structure 1104, 1106 storing the pre-calculated values may be structured as a single table similar to the following look-up table:

TABLE A

| Microsegment (e.g., 4-tuple of factors) | | | | Pre-calculated |
|---|---|---|---|---|
| ZipCode + 4 | DOB | YPC | Oldest Op Age | Value |
| 222222-1111 | Jan. 21, 1983 | 0 | 29 | 1.0 |
| 222222-1111 | Feb. 22, 1984 | 5+ | 37 | 2.1 |
| 222223-1112 | Jan. 21, 1983 | 2 | 72 | 0.8 |

For example, assuming a four-tuple combination of zip code+4, birthday, year with prior carrier, and oldest operator age, the system may generate rows in the look-up table for all possible values for each of these four user characteristics. For example, there may a predetermined number of zip codes in the state of Virginia. Meanwhile, the earliest possible birthdate of any currently living person may be Jan. 1, 1900, for example. Likewise, the "years with prior carrier" characteristic may have values ranging from 0 to some predetermined number. The number of combination of 4-tuple factors in the table for just Virginia insurance policies may be very large (e.g., approx. four-hundred million). As explained above, the number of rows in this illustrative look-up table may be equal to the multiplication of the quantity of zip code+4, quantity of possible birthdates, quantity of possible years with prior carrier values, and quantity of possible oldest operator age values.

Nevertheless, in some embodiments, the values of factors may be grouped/segmented/rounded, by an input module 1116, such that the total number of rows/entries in the illustrative look-up table of Table A may be beneficially reduced. For example, in some examples, the date-of-birth characteristic stored in the look-up table of Table A may be rounded to the year of birth for purposes of determining the total number of combinations (e.g., a Jul. 24, 1978 birthdate might be rounded to simply 1978, etc.) Likewise, decimal values for factors may be rounded up/down (or rounded pursuant to some other function) for a similar effect (e.g., a 2.4 value may be rounded down to simply a 2). In another example, the age insurance factor may be grouped so that the number of possible values for that factor are reduced (e.g., a value of A for all ages<15, a value of B for all ages between 15 and 25, a value of C for all ages between 25-35, and so on.) A person having ordinary skill in the art after review of the entirety disclosed herein will appreciate that other techniques exist and are contemplated for, in some embodiments, reducing the total number of combinations required to be stored in the data structure. At least one benefit of a smaller size look-up table is the increased speed and simplicity with which a search of the look-up table may be performed (e.g., by a search module 1108, 1120 configured to search the look-up table for a match). Moreover, while the example above describes the rounding occurring by the input module, in other examples the rounding/etc. adjustment of the factor values may be performed outside of the input module 1116, such as before even being received by the input module 1116 or after being transmitted from the input module 1116.

Depending on the size of the data structure (e.g., the look-up table of Table A) once populated with pre-calculated values, the data structure may or may not be located at the engine-less insurance rating module 1102. In some examples, the engine-less insurance rating module 1102 may include ample memory (e.g., non-volatile memory) configured to store the data structure. In other examples, the engine-less insurance rating module 1102 may access an external data store holding the data structure. For example, the external data structure may be a remotely located database server (e.g., a SQL server database, an object-oriented database server, a data store, etc.) storing a massive look-up table with pre-calculated values corresponding to N-tuple factor combinations.

Regarding the data structure 1104 illustrated in FIG. 11A, in addition to storing values of insurance factors and corresponding pre-calculated values, the data structure may also include values related to insurance coverages and limitations on those coverages. As a result, the data structure may be used, in some examples, for nearly immediate output of premium quotes for state-mandated minimum insurance, which has a predetermined set of coverages and limitations. A search module 1108 in an engine-less insurance rating module 1102 storing such a data structure may be capable, in some examples, of providing a user with an insurance quote (e.g., premium amount) without engaging in even a single arithmetic calculation and/or without communicating outside the module 1102. For example, the engine-less insurance rating module 1102 may receive inputs, through an input module 1116, comprising the values of the N-tuple (e.g., microsegment) corresponding to the user and the insurance coverages and limitations desired by the user (e.g., state-mandated minimum insurance requirements). The search module 1108 of the engine-less insurance rating module 1102 may search (e.g., perform a look-up of) the data structure to identify the entry/row/object corresponding to the received inputs, and output, through the output module 1118, the pre-calculated value stored in the data structure corresponding to the identified row. In some examples, the pre-calculated value outputted may be an insurance premium for an insurance policy for the user meeting the state-mandated minimum insurance requirement. As a result, the outputted value may be directly provided/displayed to a user without performing any arithmetic calculations on the inputted or outputted values.

In another example following in the same vein as the preceding example, an insurance rating module 1112 may assist in reducing the total number of arithmetic calculations necessary to get from insurance factor (i.e., insurance factor values) to an insurance premium amount (e.g., quoted insurance premium amount). Unlike the preceding example in which not a single multiplication/arithmetic calculation is necessary, in some examples in accordance with various aspects of the disclosure, the pre-calculated value outputted by the module 1112 may be an amount (e.g., an indicated factor value) by which a base insurance premium amount may be multiplied to calculate the insurance premium amount. Alternatively, in some examples, a base insurance premium amount may be provided to insurance rating module 1112 through an input module 1116, and the base insurance premium amount may be arithmetically combined (e.g., multiplied or summed) with the pre-calculated value retrieved from the data structure (e.g., look-up table).

Figure 11B:
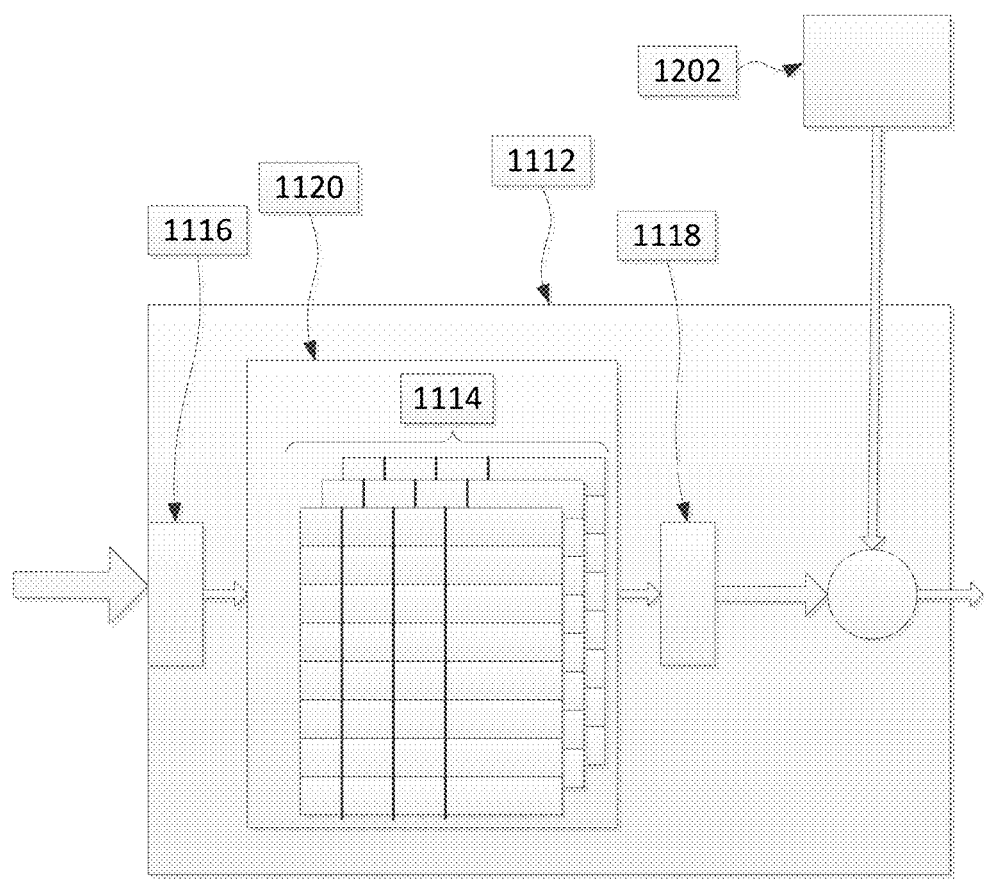

Referring to FIG. 11B, the value outputted by a search module 1120 of the insurance rating module 1112 may be multiplied by a base insurance premium amount outputted from a base premium calculation module 1202. As explained above, the base premium calculation module 1202 may be located at a remote server (see FIG. 6) or at/in the insurance rating module 1112, and may use a well-known insurance rate formula to calculate the base insurance premium amount. The base premium calculation module 1202 may comprise a real-time (e.g., near real-time) calculation tool, such as, but not limited to, ORACLE™ RTD (a datasheet for which was submitted in an Information Disclosure Statement concurrent with an earlier disclosure which is herein incorporated by reference in its entirety) or other solutions, for calculating a base insurance premium amount. The result of the arithmetic operation (e.g., multiplication, addition, etc.) of the two outputted values may equal the final insurance premium amount. Alternatively, or in addition to, the result of the multiplication may be summed with other premium amounts (e.g., non-applicable coverage premiums).

Referring to FIG. 11B, in some embodiments, an insurance rating module 1112 may comprise multiple tables instead of a single table, as in FIG. 11A. The embodiment illustrated in FIG. 11B comprises multiple tables 1114, but may essentially store the same information as the table of FIG. 11A. In one example, the multiple tables 1114 may be organized by a zip code insurance factor. The zip code may correspond to the address of the asset being insured (e.g., the address where the vehicle is primarily parked). Each table may correspond to a different zip code value. Meanwhile, the other insurance factors in the table may be identical to the insurance factors 1104 in the table of FIG. 11A (with the exception of the zip code insurance factor). As a result, a look-up/search performed by the search module 1120 of the insurance rating module 1112 of FIG. 11B may require an additional query to first identify which of the multiple tables 1114 matches the inputted zip code value, and then the appropriate table may be searched for the desired microsegment.

At least one benefit of such an arrangement of the data structure 1114 is that in examples where an insurance rating module 1112 is mostly used for a particular geographic region (i.e., the vast majority of N-tuple data inputted into the module have only a limited number of values), then the size of the multiple tables 1114 locally cached at the location may be reduced. For example, insurance agents located in City A almost exclusively services users from City A and adjacent areas. As a result, the computerized system these agents use to generate insurance premium quotes may not need the entirety of the massive table 1104, 1006 containing all of the possible combinations. Rather, the system may locally cache only those tables 1114 that correspond to zip code values of City A and its adjacent area. As a result, the size of the data structure required for the insurance rating module 1112 for these insurance agents of City A may be greatly reduced, including the resulting efficiencies. In those instances, where an insurance agent of City A attempts to request an insurance premium amount/quote for a user with a zip code outside of the pre-stored zip code area, the module 1112 may throw an exception message to the computerized system that initiated the request to cause that system to pursue alternate means of obtaining a premium quote.

Figure 12:
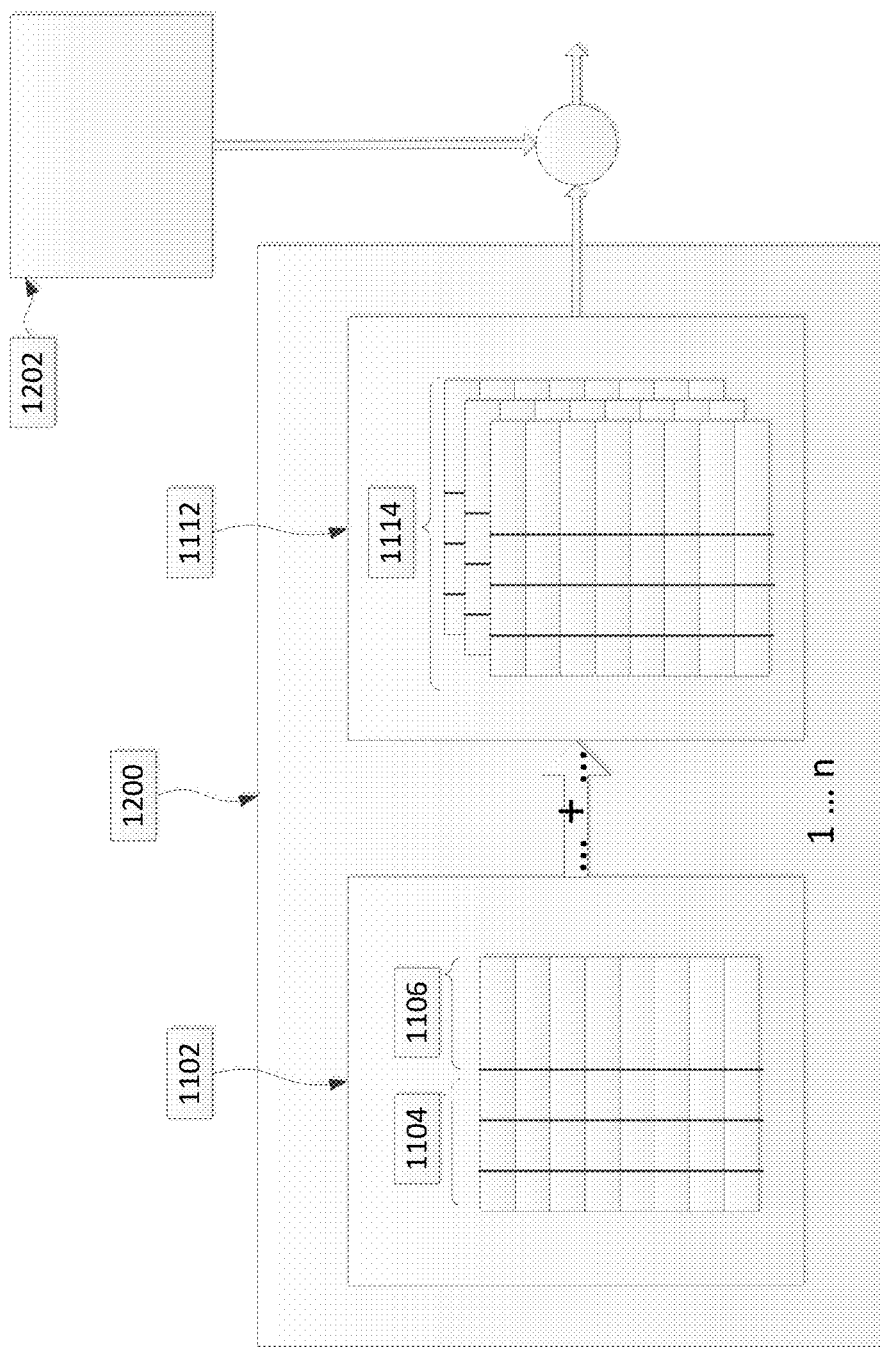
FIG. 12 shows an environment comprising various computing systems from FIGS. 11A and 11B that may be used to implement aspects of the disclosure.

Referring to FIG. 12, in some embodiments in accordance with various aspects of the disclosure, a plurality of insurance rating modules 1102, 1112 may be used to calculate a final insurance premium amount/quote. In the insurance rating system 1200 of FIG. 12, a first group of factors may be inputted into a first module 1102, and a second group of factors may be inputted into a second module 1112. The results outputted from the modules 1102, 1112 may be merged/combined/summed, and then summed/multiplied (as appropriate) with a base insurance premium amount from a base premium calculation module 1202 to output an insurance premium amount/quote. In one example, the first group of factors may be personal insurance factors (e.g., factors specific to a user's characteristics—e.g., age, gender, smoker/non-smoker, etc.), and the second group of factors may be the four-tuple of insurance factors/characteristics (e.g., zip code, DOB, YPC, and oldest operator age) described in the CGR system above (thus the insurance rating system 1200 may incorporate aspects of the CGR system described herein.) In some examples, a third group of factors may be vehicle factors (e.g., factors specific to a vehicle's characteristics—e.g., current approximate mileage, engine size, color, body style, number of passenger doors, maximum top speed, etc.). In some systems, factors from one, some, or all three groups of factors may be considered.

For example, in an insurance rating system 1200 including a CGR system, a look-up table may comprise a four-tuple comprising zip code+4, DOB, YPC, and oldest operator age characteristics. Meanwhile, other non-insurance characteristics may also be stored in the look-up table alongside the four-tuple. For example, "bio-mimicry" may be used to associate four-tuples with other non-insurance information associated with the user. For example, the system 1200 may determine that a user/users corresponding to a particular aforementioned four-tuple (e.g., microsegment) has paid their insurance premium amount on the last day of the billing cycle for the last fifteen consecutive payments. As such, the system 1200 may utilize bio-mimcry in storing a value in an appropriate (e.g., non-insurance) characteristic of the microsegment in the look-up table to reflect this behavior. Likewise, other behavioral traits and other characteristics may be mined/analyzed and stored in the look-up table as bio-mimcry type of characteristics. The characteristics, in one example, may be stored as additional columns added to a look-up table. In some embodiments, methods may be organic, probabilistic, synthetic, encrypted, and/or random. In other examples, based on the complexity of the bio-mimcry data being stored, the look-up table (or other data structure in accordance with various aspects of the disclosure) may be linked/associated with various types of arrays, objects, elements, nodes for storing the bi-mimcry data. Other systems may retrieve the stored bi-mimcry data associated with microsegments and analyze the data, for example, to market (or other purposes) to users of the microsegment. Examples of such systems may include market research systems, web analytics systems, and other systems.

Additional Enhancements to a Complementary Group Rating System.

In some embodiments of the disclosure, a CGR system may be more efficiently updated using various enhancement features. For example, the CGR system may be configured to recognize a "wildcard" value, which means that any value matches the "wildcarded" cell in the insurance rating table 1114 in the data store. If a variable is "wildcarded," it may be represented in the table as an asterisk ("*") (or any other predefined character/symbol) as illustrated in illustrative table 1400 in FIG. 14. For example, an "*" in the Zip column 1402 of the table will match any zip code value (e.g., 49267, 49268, etc.). Alternatively, in some embodiments, a query indicating an "*" will have essentially wildcarded the zip code value.

As such, in response to a query, the CGR system may return multiple rows instead of being mandated to just a single row. The CGR system may be enhanced, in some embodiments, to aggregate via a predefined operation (e.g., multiplication, addition, other mathematical operations, etc.) the multiple rows/values into a single rate calculation. In some examples, an insurance rating system (e.g., a search module 1108 of an insurance rating system) may aggregate the resulting, multiple rows to calculate a single value. For purposes of illustration, in one example, if three rows are matched and returned with bodily injury (BI) factor values of 0.85, 1.25, and 0.9, then the aggregated BI factor value would be 0.95625. Then, this BI factor value may be used as an input for pricing the user's insurance policy. In some examples, the aggregated value may be used in combination with a base insurance premium amount (e.g., from a module 1202) to calculate an insurance premium amount quote to a user (e.g., potential customer, existing customer, insurance agent, online software application, etc.)

Furthermore, in some embodiments, instead of storing the entire product (e.g., Cartesian product), the original tables may be embedded into the data store/database of the CGR system without the loss of information. In prior embodiments of the CGR system, the table may collect and store every possible variable of interest for rating. In one example involving an insurance rating plan, the factors might include zip code, number of vehicles, age of oldest, number of speeding incidents, number of major incidents, deductible amount, and/or limit. Instead of separate tables for each, every possible combination of characteristics/factors may be enumerated into a single, large table. For example, for an insurance rating plan of similar complexity to SRM6, there may be upwards of 200 variables/characteristics/factors, and assuming, for illustrative purposes, that each variable has an average minimum of two levels, the resulting table would be 2^200 rows long, which results in an onerous table size. With the aforementioned features of the disclosure, the CGR system may be brought down to a more manageable size within the technological framework.

In addition, with the incorporation of a wildcarding feature, new steps in the rating plan stored in the CGR system may simply be added by inserting a row into the table. For example, an interaction between two factors, e.g., "Age of Oldest" and "Number of Speeding Incidents," may be added to an insurance rating plan simply by appending additional rows to the table. In some examples, all other (irrelevant) factors in the newly added rows may be wildcarded, thus indicating that the interaction between the two factors applies regardless of the value of the other factors. As such, provided no new variables are needed, modifications to the rating plan may be done via row-level manipulations of the table stored in the CGR system. In yet another example, in FIG. 14, a new row 1404 may be added to the table 1400 to represent a plan rating rule that applies to all insurance policies where the age of the oldest person covered under the insurance policy (i.e., "Age Oldest") value is between age 16 and 29. When pricing for a policy with these characteristics is requested, the rating table will generate an output that now further include an output of "2" for the BI factor (bodily injury factor) and a "2" for the COLL factor (collision factor).

In some examples, placeholder variables/factors/characteristics may be included in the table 1400, but populated with all wildcard values; then, when a new variable/factor/characteristic is desired, the placeholder may be used. Therefore, such a placeholder feature with wildcarding provides a level of flexibility previously unavailable to a CGR system.

Of course, in addition to adding new rows to the table, the disclosure contemplates removing rows from the rating plan as desired. Moreover, in some instances, one or more columns may be removed once a variable/factor/characteristic is found to no longer be relevant to a rating plan. In other examples, the CGR system may keep the column, but simply replace all values in the column with a wildcard value, thus converting the column into a placeholder, as described above, for potential future use.

Figure 15:
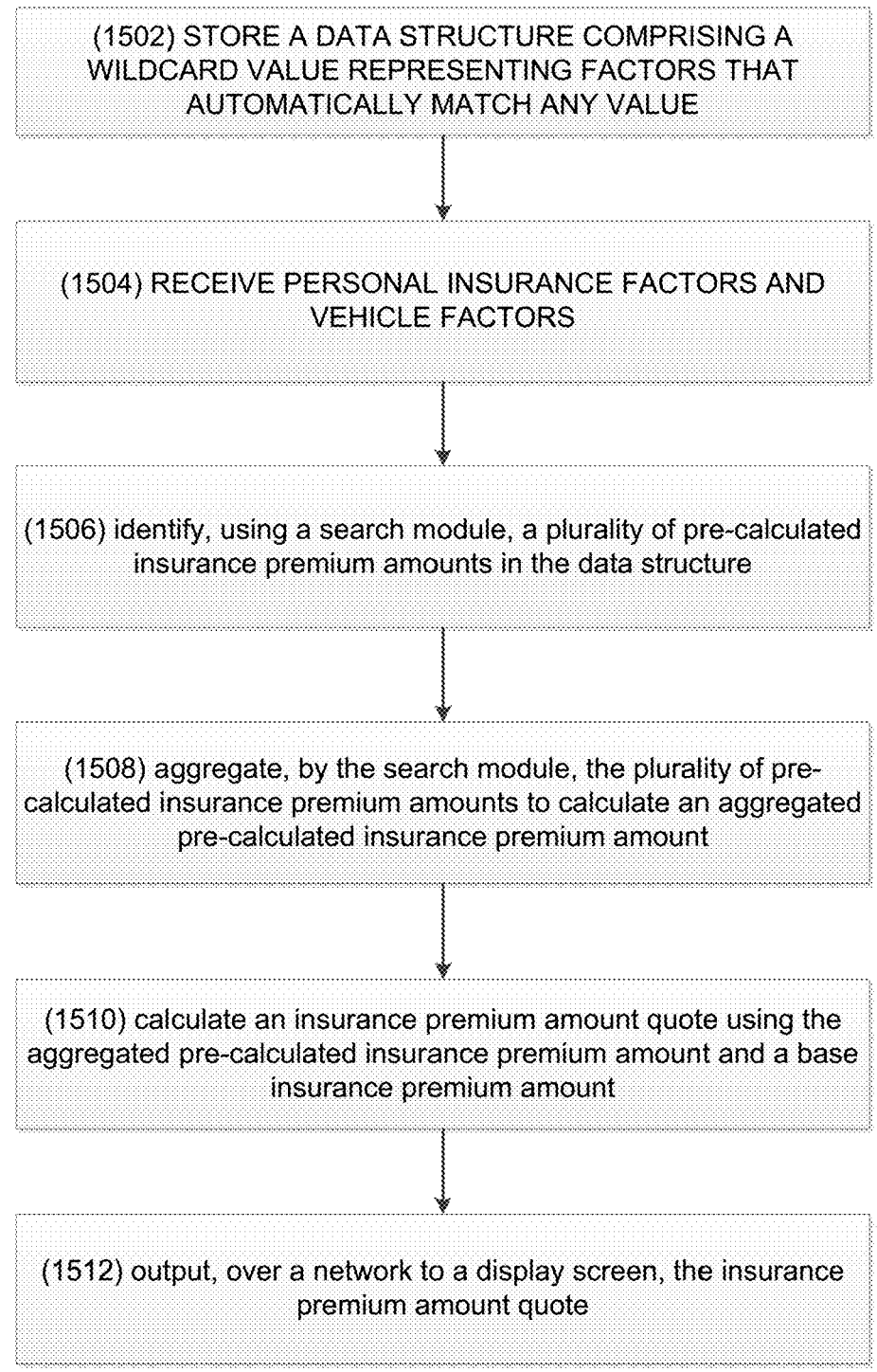
FIG. 15 is a flow diagram illustrating an example method of updating an insurance rating plan and calculating an insurance premium amount in accordance with one or more aspects of the disclosure.

Referring to FIG. 15, in accordance with various aspects of the disclosure, a method is disclosed for updating an insurance rating plan and calculating an insurance premium amount in accordance with one or more aspects of the disclosure. The method may be performed by a computerized apparatus including a processor and a memory unit storing non-transitory computer-executable instructions that, when executed by the processor, may cause the system to perform numerous steps. For example, the system may, in step 1502, store a data structure 1400 comprising a wildcard value 1406 representing factors that automatically match any value. The data structure 1400 may comprises the wildcard value in multiple fields of the data structure, and may be stored in computer memory 115 by the computer processor 103.

In step 1504, the system may receive through an input module 109, the aforementioned personal insurance factors and vehicle factors of the vehicle. Alternatively, the system may receive the aforementioned values corresponding to factors through a path other than through the input module 109. The personal insurance factors may be associated with the user of the vehicle, and the personal insurance factors may comprise, in some examples, at least a first personal insurance factor and a second personal insurance factor; and in some examples, a third or more personal insurance factors.

In step 1506, the system may identify a plurality of pre-calculated insurance premium amounts in the data structure 1400. In some examples, a search module 1108 may be used to search the data structure 1400 to identify values corresponding to the personal insurance factors and vehicle factors. The identified values may correspond to a plurality of pre-calculated insurance premium amounts in the data structure 1400. In one example involving an insurance rating system, a search module 1108 of an insurance rating module may access a massive data structure 1400 in computer memory storing the combinations resulting from the combination of a plurality of insurance factors. The search module 1108 may access the data structure 1400 to retrieve one or more pre-calculated values corresponding to the particular inputted combination of values for the insurance factors (e.g., personal insurance factors). The search module 108 may access data stored in memory using one or more search methods known in the art, such as sharding, sorting, distributed searching, and others, for locating and retrieving values from a massive data store. The search module 1108 may return multiple rows, in contrast to the single row that was returned in the embodiments described earlier in this disclosure. These returned values (e.g., a plurality of pre-calculated insurance pre-calculated insurance premium amounts) may be aggregated in step 1508.

In step 1508, the system may combine (e.g., aggregate) the plurality of pre-calculated insurance premium amounts to calculate an aggregated pre-calculated insurance premium amount. The aggregation may take place in the form of a predefined operation (e.g., multiplication, addition, other mathematical operations, etc.) on the multiple returned rows/values. As a result of the aggregation, the plurality of amounts may be consolidated/combined into a single, aggregated pre-calculated insurance premium amount. A person having ordinary skill in the art after review of the entirety disclosed herein will recognize that a single amount may not require, in some examples, a simple numeric value; rather, a single amount may be embodied in a matrix (e.g., a 2-dimensional matrix) or other mathematical construct representing a single combined output.

In step 1510, the aggregated pre-calculated insurance premium amount and a base insurance premium amount may be used to calculate an insurance premium amount quote. In some examples, the outputted value (e.g., aggregated pre-calculated insurance premium amount) by an output module 1118 may be multiplied with the base insurance premium amount to calculate an insurance premium amount. In one embodiment, the insurance rating module 1112 may perform the multiplication operation (e.g., arithmetic step) inside and/or outside of the module 112. For example, the arithmetic operation(s) may be performed by the output module 1118. In another example, this disclosure contemplates varying degrees of arithmetic computations in a hybrid approach where some of the arithmetic computations are eliminated/reduced. Although such an illustrative module 1112 might not be a truly "engine-less" insurance rating module, it may provide a semi-engineless embodiment.

In step 1512, the system may output, by a computer processor 103 over the network 131 to the display screen on a user device 608C, the insurance premium amount quote. In alternate embodiments, the output may be displayed or otherwise perceptibly conveyed (e.g., sound, haptic feedback, etc.) to a user or device (e.g., a vehicle, kiosk, laptop, desktop, tablet, smartphone, etc.) connected, either directly or indirectly, to the network 131.

The spirit of the disclosure contemplates one or more of the aforementioned steps being optional, combined/merged, and/or performed in a different order/location than illustrated in FIG. 15. For example, in embodiments involving a semi-engine-less system, the system may be configured to reduce the number of arithmetic calculations that are performed outside of the engine-less rating module.

In one example involving a user's vehicle with a vehicle telematics unit 608D installed inside. The vehicle telematics unit 608D may be configured to measure one or more vehicle factors of the vehicle. In some examples, the vehicle telematics unit 608D may be tethered to the vehicle, for example, by way of short-range wireless communication (e.g., Bluetooth transmitter/receiver) or wired means (e.g., through the on-board diagnostics (OBD) port).

Meanwhile, the user of the vehicle may be in possession of a user device 608C with a display screen. The user device 608C may communicate with a remote, online vehicle insurance rating server 101 to obtain insurance quotes for display on the display screen. In an alternate example, the user device may be a kiosk 608B or other electronic device for communicating with the user.

The aforementioned online vehicle insurance rating server 101 may perform various operations using input data and stored data to generate the output data. In some examples, the online vehicle insurance rating server may comprise a linear programming platform including, inter alia, an application programmer's interface configured to perform optimization using one or more optimization libraries (e.g., the commercially-available GUROBI™ optimizer). The linear programming platform may comprise an optimization engine and associated components.

In addition, the online vehicle insurance rating server 101 may be communicatively coupled over a network with a remote application server, in some examples. That remote application server may be configured to generate a base insurance premium amount and transmit the generated base insurance premium amount to the online vehicle insurance rating server. As such, the online vehicle insurance rating server may use the received amount to calculate a insurance premium amount quote. In some examples, the remote application server may comprise a real-time calculation tool 1202, as described above. The tool may be used, in some examples, to provide nearly instantaneous rate quotes after a ratings data model update.

Furthermore, the online vehicle insurance rating server may communicate with a data storage unit. The data storage unit may store ratings data in a single table 1400. The single table may, in some examples, include a plurality of embedded tables. The single table may also comprise a wildcard value representing factors that automatically match any value. The system is designed such that the presence of the wildcard value in the table does not affect external query requests. For example, one or more received personal insurance factors and vehicle factors may be formatted into a database search query format (e.g., SQL format), and these queries may be run against the table regardless of whether or not the table contains wildcards. In other words, the system (e.g., search module 1108) may be configured to accommodate the presence of wildcards without requiring external queries to be revised. As such, older queries from legacy systems may still execute successfully against the data storage unit without requiring a complete re-write of queries.

Moreover, the ratings data stored in a single table 1400 may be configured to be dynamically updated. The system (e.g., 302B) may add new rows to the table 1400 that corresponds to a new insurance rating rule, or may remove an existing rows from the table 1400 that correspond to a deprecated/obsolete insurance rating rule. The addition/deletion of rows from the table results, in some examples, in a real-time update to subsequent outputs of the insurance premium amount quote. In other words, as an insurance company wishes to add/remove rules to its rating model, the system permits nearly instantaneous updates of the model by adding/removing rows with wildcards. As such, a new rule that concerns just several insurance factors, but not others, may be efficiently added to the table 1400 through the use of wildcarding the irrelevant factors. The new rules are immediately available to the online vehicle insurance rating server 101 so that any quotes subsequently generated and displayed to a user reflect the updated rules.

Although various embodiments throughout the disclosure have discussed storing data in one or more tables (e.g., look-up tables), the disclosure is no so limited. Various other data structures will be apparent to a person having ordinary skill in the art after review of the entirety disclosed herein. For example, the N-tuple of factors and corresponding pre-calculated value(s) may be stored as one or more tables in a SQL database. In another example, they may be stored as objects in an object-oriented database. In yet another example, they may be stored as in any format that permits high-speed, efficient searching capabilities. For example, the N-tuple of factors and corresponding pre-calculated value(s) may be linearly stored in computer memory, but may utilize techniques similar to searching algorithm (e.g., Google Internet search engine) to index and efficiently search. The aforementioned computer memory may comprise a file system (e.g., HDFS, ACFS, LTFS, VMFSS, ReFS, FAT32, NTFS, HFS, and others) to store the pre-calculated values. Moreover, in some embodiments, a distributed computing environment may be used in which a plurality (e.g., thousands) of computers may be used to concurrently search the massive data structure (e.g., look-up table) and these computers may communicate amongst each other to coordinate the search effort.

While various examples provided herein have referenced specific types of insurance (e.g., vehicle insurance), the spirit of the disclosure contemplates application to all types of insurance offerings, including, but not limited to homeowners insurance, renters insurance, life insurance, motorcycle insurance, business insurance, and other type of insurance product where numerous factors are considered in calculating a payment amount (e.g., a premium amount) for a user (e.g., individual, family, entity, etc.)

While the aspects described herein have been discussed with respect to specific examples including various modes of carrying out aspects of the disclosure, those skilled in the art will appreciate that there are numerous variations and permutations of the above described systems and techniques that fall within the spirit and scope of the disclosure. For example, although "zip code" has been used throughout this disclosure, those skilled in the art will appreciate that, as used, "zip code" may encompass British royal mail codes, European postal codes, and other comparable zip codes in other jurisdictions.

We claim:

1. A system comprising:
   a vehicle telematics unit disposed inside a vehicle operated by a user, the vehicle telematics unit communicatively tethered to the vehicle and configured to measure one or more vehicle operational factors;
   a user device comprising a display screen visible to the user;
   an online vehicle insurance rating server comprising a computer processor and a computer memory storing computer-executable instructions;
   a data storage unit communicatively coupled to the online vehicle insurance rating server, the data storage unit storing all ratings data in a single table comprising a plurality of embedded tables, wherein the single table comprises one or more wildcard values representing one or more factors that automatically match any value; and
   a network communicatively coupling the online vehicle insurance rating server and the user device;
   wherein the computer-executable instructions, when executed by the computer processor of the online vehicle insurance rating server, cause the online vehicle insurance rating server to:
     store, in the computer memory by the computer processor, a data structure comprising combinations of a first plurality of personal insurance factors and a first plurality of vehicle operational factors, and a pre-calculated insurance premium amount associated with each combination, wherein the data structure comprises the one or more wildcard values in multiple fields of the data structure;
     receive, by the computer processor using an input module, a second plurality of personal insurance factors associated with the user of the vehicle and a second plurality of vehicle operational factors of the vehicle of the user measured by the vehicle telematics unit, wherein the second plurality of personal insurance factors comprise at least a first personal insurance factor and a second personal insurance factor;
     identify, by the computer processor using a search module, a plurality of pre-calculated insurance premium amounts in the data structure directly corresponding to the second plurality of personal insurance factors and the second plurality of vehicle operational factors;
     aggregate, by the search module, the identified plurality of pre-calculated insurance premium amounts to determine an aggregated pre-calculated insurance premium amount;
     determine, by the computer processor, based directly on the aggregated pre-calculated insurance premium amounts and without performing additional calculations, an insurance premium amount quote; and
     output, by the computer processor, over the network to the display screen on the user device, the insurance premium amount quote.

2. The system of claim 1, wherein the vehicle telematics unit disposed inside the vehicle is configured to transmit the second plurality of vehicle operational factors of the vehicle to the online vehicle insurance rating server.

3. The system of claim 1, wherein the second plurality of personal insurance factors and the second plurality of vehicle operational factors are formatted into a database search query format, wherein the database search query format is unaffected by a presence of the one or more wildcard values in the data structure.

4. The system of claim 3, wherein the database search query format is SQL.

5. The system of claim 1, wherein the insurance premium amount quote is further based on a base insurance premium amount, wherein the base insurance premium amount is received at the computer processor from a real-time calculation tool, which is communicatively coupled with the computer processor.

6. The system of claim 1, wherein the single table storing all ratings data is configured to be dynamically updated, wherein the computer-executable instructions, when executed by the computer processor of the online vehicle insurance rating server, further cause the online vehicle insurance rating server to:
   add a new row to the single table that corresponds to a new insurance rating rule; and
   remove an existing row from the single table that corresponds to an existing insurance rating rule.

7. The system of claim 6, wherein the adding the new row and the removing the existing row result in a real-time update to subsequent outputs of the insurance premium amount quote.

8. The system of claim 1, wherein the online vehicle insurance rating server further comprises:
   a linear programming platform including an application programmer's interface configured to perform optimization using one or more optimization libraries;
   wherein the linear programming platform comprises an optimization engine and associated components.

9. The system of claim 1, further comprising:
   a remote application server, which is communicatively coupled with the computer processor, configured to generate a base insurance premium amount and transmit the generated base insurance premium amount to the computer processor.

10. The system of claim 1, wherein the input module is further configured to round the first personal insurance factor to an integer value before sending to the search module, wherein the first personal insurance factor is one of age, gender, and non-smoker.

11. The system of claim 10, wherein the computer-executable instructions, when executed by the computer processor of the online vehicle insurance rating server, further cause the online vehicle insurance rating server to: round, by the computer processor using the input module, the first personal insurance factor from a decimal value to an integer value.

12. A method of calculating an insurance premium amount using an online vehicle insurance rating server, comprising:
   storing, in a computer memory by a computer processor of the online vehicle insurance rating server, a data structure comprising combinations of a first plurality of personal insurance factors and a first plurality of vehicle operational factors, and a pre-calculated insurance premium amount associated with each combination, wherein the data structure comprises one or more wildcard values in multiple fields of the data structure, wherein the one or more wildcard values represent one or more factors that automatically match any value;

receiving, by the computer processor using an input module, a second plurality of personal insurance factors associated with a user of a vehicle, wherein the second plurality of personal insurance factors comprise at least a first personal insurance factor and a second personal insurance factor;

receiving, by the computer processor and from a vehicle telematics unit disposed inside the vehicle associated with the user, a second plurality of vehicle operational factors of the vehicle of the user measured by the vehicle telematics unit, the vehicle telematics unit communicatively tethered to the vehicle and configured to measure one or more vehicle operational factors;

identifying, by the computer processor using a search module, a plurality of pre-calculated insurance premium amounts in the data structure directly corresponding to the second plurality of personal insurance factors and the second plurality of vehicle operational factors received from the input module;

aggregating, by the search module, the identified plurality of pre-calculated insurance premium amounts to determine an aggregated pre-calculated insurance premium amount;

calculating, by the computer processor, based directly on the aggregated pre-calculated insurance premium amounts and without performing additional calculations, an insurance premium amount quote; and outputting, by the computer processor, over a network to a display screen on an electronic device, the insurance premium amount quote.

13. The method of claim 12, wherein the second plurality of personal insurance factors and the second plurality of vehicle operational factors are formatted into a database search query format, wherein the database search query format is unaffected by a presence of the one or more wildcard values in the data structure, wherein the database search query format is SQL.

14. The method of claim 12, wherein a single table stores all ratings data and is configured to be dynamically updated, the method further comprising:
add a new row to the single table that corresponds to a new insurance rating rule; and
remove an existing row from the single table that corresponds to an existing insurance rating rule,
wherein the adding the new row and the removing the existing row result in a real-time update to subsequent outputs of the insurance premium amount quote.

15. The method of claim 12, wherein the input module is further configured to round the first personal insurance factor to an integer value before sending to the search module, wherein the first personal insurance factor is one of age, gender, and non-smoker.

16. A non-transitory computer-readable medium storing computer-executable instructions that, when executed by a computer processor, cause a system to:

store, in a computer memory by the computer processor, a data structure comprising combinations of a first plurality of personal insurance factors and a first plurality of vehicle operational factors, and a pre-calculated insurance premium amount associated with each combination, wherein the data structure comprises one or more wildcard values in the data structure, and wherein the one or more wildcard values represent one or more factors that automatically match any value;

receive, by the computer processor using an input module, a second plurality of personal insurance factors associated with a user of a vehicle, wherein the second plurality of personal insurance factors comprise at least a first personal insurance factor and a second personal insurance factor;

receive, by the computer processor and from a vehicle telematics unit disposed inside the vehicle associated with the user, a second plurality of vehicle operational factors of the vehicle of the user measured by the vehicle telematics unit, the vehicle telematics unit communicatively tethered to the vehicle and configured to measure one or more vehicle operational factors;

identify, by the computer processor using a search module, a plurality of pre-calculated insurance premium amounts in the data structure directly corresponding to the second plurality of personal insurance factors and the second plurality of vehicle operational factors received from the input module;

aggregate, by the search module, the plurality of pre-calculated insurance premium amounts to determine an aggregated pre-calculated insurance premium amount;

determine, by the computer processor, based directly on the aggregated pre-calculated insurance premium amounts and without performing additional calculations, an insurance premium amount quote; and output, by the computer processor, over a network to a display screen on a user device, the insurance premium amount quote.

17. The non-transitory computer-readable medium of claim 16, wherein the computer processor is communicatively coupled to a remote application server configured to generate a base insurance premium amount and transmit the generated base insurance premium amount to the computer processor.

18. The non-transitory computer-readable medium of claim 16, storing computer-executable instructions that, when executed by the computer processor, further cause the system to:
add a new row to the data structure that corresponds to a new insurance rating rule; and
remove an existing row from the data structure that corresponds to an existing insurance rating rule,
wherein the adding the new row and the removing the existing row result in a real-time update to subsequent outputs of the insurance premium amount quote.

* * * * *